US012694551B2

(12) United States Patent
Wen et al.

(10) Patent No.: US 12,694,551 B2
(45) Date of Patent: Jul. 28, 2026

(54) FOUNDATION MODEL FOR ZERO-SHOT STEREO MATCHING

(71) Applicant: NVIDIA Corporation, Santa Clara, CA (US)

(72) Inventors: Bowen Wen, Issaquah, WA (US); Matthew Trepte, San Francisco, CA (US); Orazio Gallo, Santa Cruz, CA (US); Jan Kautz, Lexington, MA (US); Stanley Thomas Birchfield, Sammamish, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 19/055,046

(22) Filed: Feb. 17, 2025

(65) Prior Publication Data

US 2026/0148405 A1 May 28, 2026

Related U.S. Application Data

(60) Provisional application No. 63/726,916, filed on Dec. 2, 2024, provisional application No. 63/723,727, filed on Nov. 22, 2024.

(51) Int. Cl.
G06T 7/593 (2017.01)
G06T 7/62 (2017.01)
(Continued)

(52) U.S. Cl.
CPC ............... G06T 7/593 (2017.01); G06T 7/62 (2017.01); G06T 7/74 (2017.01); H04N 13/128 (2018.05);
(Continued)

(58) Field of Classification Search
None
See application file for complete search history.

(56) References Cited

U.S. PATENT DOCUMENTS

| | | | |
|---|---|---|---|
| 11,062,471 B1 * | 7/2021 | Zhong | G06T 7/593 |
| 11,257,272 B2 | 2/2022 | Rowell et al. | |

(Continued)

OTHER PUBLICATIONS

Su, J., et al., "RoFormer: Enhanced transformer with rotary position embedding," Neurocomputing, 568:127063, 2024.

(Continued)

*Primary Examiner* — Eileen M Adams

(74) *Attorney, Agent, or Firm* — Leydig, Voit & Mayer, Ltd.

(57) ABSTRACT

Systems and methods are disclosed that use a Foundational Stereo Model to generate an output disparity map. The Foundational Stereo Model includes side-tuning adapters (STA) that utilize a vision transformer (ViT) and a convolutional neural network (CNN) to generate feature maps. Specifically, the CNN may be used to adapt the ViT-based monocular depth estimation network for the stereo setup, which synergizes the strengths of both CNN and ViT architectures. In addition, the Foundational Stereo Model includes an attentive hybrid cost filtering (AHCF) that uses two branches that also utilizes the advantages of both a transformer architecture and the CNN architecture. Furthermore, the Foundational Stereo Model may perform iterative refinement of an initial disparity map to obtain the output disparity map based on performing a convolutional gated recurrent unit (GRU) operation.

29 Claims, 10 Drawing Sheets

(51) Int. Cl.
    *G06T 7/73*          (2017.01)
    *H04N 13/128*      (2018.01)
    *H04N 13/194*      (2018.01)
    *H04N 13/271*      (2018.01)
    *H04N 13/00*       (2018.01)

(52) U.S. Cl.
    CPC ......... *H04N 13/194* (2018.05); *H04N 13/271*
        (2018.05); *G06T 2207/10012* (2013.01); *G06T*
           *2207/20016* (2013.01); *G06T 2207/20081*
        (2013.01); *G06T 2207/20084* (2013.01); *G06T*
          *2207/20228* (2013.01); *H04N 2013/0081*
                       (2013.01)

(56)           References Cited

U.S. PATENT DOCUMENTS

| | | | |
|---|---|---|---|
| 12,518,477 | B1 | 1/2026 | Wen et al. |
| 2019/0052908 | A1* | 2/2019 | Mertens .................... G09G 5/02 |
| 2021/0326694 | A1* | 10/2021 | Wang ...................... G06N 3/084 |
| 2023/0368337 | A1* | 11/2023 | Karras ....................... G06T 5/70 |
| 2024/0221371 | A1 | 7/2024 | Kanazawa |
| 2024/0394839 | A1 | 11/2024 | Schroers et al. |
| 2025/0308048 | A1* | 10/2025 | Dwivedi ................... G06T 7/55 |
| 2026/0004444 | A1* | 1/2026 | Venkataraman ....... B25J 9/1697 |

OTHER PUBLICATIONS

Tankovich, V., et al., "HITNet: Hierarchical iterative tile refinement network for real-time stereo matching," In Proceedings of the IEEE/CVF Conference on Computer Vision and Pattern Recognition (CVPR), pp. 14362-14372, 2021.

Teed, Z., et al., "RAFT: Recurrent all-pairs field transforms for optical flow," In Proceedings of the European Conference on Computer Vision (ECCV), pp. 402-419, 2020.

Tobin, J., et al., "Domain randomization for transferring deep neural networks from simulation to the real world," In IEEE/RSJ International Conference on Intelligent Robots and Systems (IROS), pp. 23-30, 2017.

Tosi, F., et al., "Neural disparity refinement," IEEE Transactions on Pattern Analysis and Machine Intelligence (PAMI), 2024.

Tremblay, J., et al., "Falling things: A synthetic dataset for 3D object detection and pose estimation," In Proceedings of the IEEE Conference on Computer Vision and Pattern Recognition Workshops, pp. 2038-2041, 2018.

Tremblay, J., et al., "Deep object pose estimation for semantic robotic grasping of household objects," In Conference on Robot Learning (CoRL), pp. 306-316, 2018.

Vaswani, A., et al., "Attention is all you need," Advances in Neural Information Processing Systems (NeurIPS), 30, 2017.

Wang, Q., et al., "IRS: A large naturalistic indoor robotics stereo dataset to train deep models for disparity and surface normal estimation," In IEEE International Conference on Mulitmedia and Expo (ICME), 2021.

Wang, S., et al., "DUSt3R: Geometric 3D vision made easy," In Proceedings of the IEEE/CVF Conference on Computer Vision and Pattern Recognition (CVPR), pp. 20697-20709, 2024.

Wang, W., et al., "TartanAir: A dataset to push the limits of visual slam," In IEEE/RSJ International Conference on Intelligent Robots and Systems (IROS), pp. 4909-4916, 2020.

Wang, X., et al., "Selective-Stereo: Adaptive frequency information selection for stereo matching," In Proceedings of the IEEE/CVF Conference on Computer Vision and Pattern Recognition (CVPR), pp. 19701-19710, 2024.

Weinzaepfel, P., et al., "CroCo v2: Improved cross-view completion pretraining for stereo matching and optical flow," In Proceedings of the IEEE International Conference on Computer Vision (ICCV), pp. 17969-17980, 2023.

Wen, B., et al., "FoundationPose: Unified 6D pose estimation and tracking of novel objects," In Proceedings of the IEEE/CVF Conference on Computer Vision and Pattern Recognition (CVPR), pp. 17868-17870, 2024.

Xu, G., et al., "Attention concatenation vol. for accurate and efficient stereo matching," In Proceedings of the IEEE/CVF Conference on Computer Vision and Pattern Recognition (CVPR), pp. 12981-12990, 2022.

Xu, G., et al., "Iterative geometry encoding vol. for stereo matching," In Proceedings of the IEEE/CVF Conference on Computer Vision and Pattern Recognition, pp. 21919-21928, 2023.

Xu, G., et al., "IGEV++: Iterative multirange geometry encoding volumes for stereo matching," arXiv preprint arXiv:2409.00638, 2024.

Xu, H., et al., "AANet: Adaptive aggregation network for efficient stereo matching," In Proceedings of the IEEE/CVF Conference on Computer Vision and Pattern Recognition (CVPR), pp. 1959-1968, 2020.

Xu, H., et al., "Unifying flow, stereo and depth estimation," IEEE Transactions on Pattern Analysis and Machine Intelligence (PAMI), 2023.

Yang, G., et al., "Hierarchical deep stereo matching on high-resolution images," In Proceedings of the IEEE/CVF Conference on Computer Vision and Pattern Recognition (CVPR), pp. 5515-5524, 2019.

Yang, G., et al., "DrivingStereo: A large-scale dataset for stereo matching in autonomous driving scenarios," In Proceedings of the IEEE/CVF Conference on Computer Vision and Pattern Recognition (CVPR), pp. 899-908, 2019.

Yang, J., et al., "Track anything: Segment anything meets videos," arXiv preprint arXiv:2304.11968, 2023.

Yang, L., et al., "Depth anything: Unleashing the power of large-scale unlabeled data," In Proceedings of the IEEE/CVF Conference on Computer Vision and Pattern Recognition (CVPR), pp. 10371-10381, 2024.

Yang, L., et al., "Depth anything v2," In Proceedings of Neural Information Processing Systems (NeurIPS), 2024.

Yang, M., et al., "WaveletStereo: Learning wavelet coefficients of disparity map in stereo matching," In Proceedings of the IEEE/CVF Conference on Computer Vision and Pattern Recognition (CVPR), pp. 12885-12894, 2020.

Zhang, F., et al., "GA-Net: Guided aggregation net for end-to-end stereo matching," n Proceedings of the IEEE/CVF Conference on Computer Vision and Pattern Recognition (CVPR), pp. 185-194, 2019.

Zhang, F., et al., "Domain-invariant stereo matching networks," In Proceedings of the European Conference on Computer Vision (ECCV), pp. 420-439, 2020.

Zhang, J., et al., "Side-tuning: a baseline for network adaptation via additive side networks," In Proceedings of the European Conference on Computer Vision (ECCV), pp. 698-714, 2020.

Zhang, Y., et al., "Learning representations from foundation models for domain generalized stereo matching," In European Conference on Computer Vision, pp. 146-162, Springer, 2024.

Zhao, H., et al., "EAI-Stereo: Error aware iterative network for stereo matching," In Proceedings of the Asian Conference on Computer Vision (ACCV), pp. 315-332, 2022.

Zhao, H., et al., "High-frequency stereo matching network," n Proceedings of the IEEE/CVF Conference on Computer Vision and Pattern Recognition (CVPR), pp. 1327-1336, 2023.

Zhao, X., et al., "Fast segment anything," arXiv preprint arXiv:2306.12156, 2023.

Bao, W., et al., "InStereo2k: a large real dataset for stereo matching in indoor scenes," Science China Information Sciences, 63:1-11, 2020.

Bhat, S.F., et al., "ZoeDepth: Zero-shot transfer by combining relative and metric depth," arXiv preprint arXiv:2302.12288, 2023.

Bochkovskii, A., et al., "Depth pro: Sharp monocular metric depth in less than a second," arXiv preprint arXiv:2410.02073, 2024.

Butler, D., et al., "A naturalistic open source movie for optical flow evaluation," In Proceedings of the European Conference on Computer Vision (ECCV), pp. 611-625, 2012.

(56) References Cited

OTHER PUBLICATIONS

Cabon, Y., et al., "Virtual KITTI 2," arXiv preprint arXiv:2001. 10773, 2020.

Caron, M., et al., "Emerging properties in self-supervised vision transformers," In Proceedings of the IEEE International Conference on Computer Vision (ICCV), pp. 7650-9660, 2021.

Chang, J.R., et al., "Pyramid stereo matching network," In Proceedings of the IEEE/CVF Conference on Computer Vision and Pattern Recognition (CVPR), pp. 5410-5418, 2018.

Chang, T., et al., "Domain generalized stereo matching via hierarchical visual transformation," In Proceedings of the IEEE/CVF Conference on Computer Vision and Pattern Recognition (CVPR), pp. 9559-9568, 2023.

Chen, L., et al., "Learning the distribution of errors in stereo matching for joint disparity and uncertainty estimation," In Proceedings of the IEEE/CVF Conference on Computer Vision and Pattern Recognition (CVPR), pp. 17235-17244, 2023.

Chen, Z., et al., "Vision transformer adapter for dense predictions," ICLR, 2023.

Chen, Z., et al., "SlimSAM: 0.1% data makes segment anything slim," NeurIPS, 2023.

Chen, Z., et al., "Mocha-stereo: Motif channel attention network for stereo matching," In Proceedings of the IEEE/CVF Conference on Computer Vision and Pattern Recognition (CVPR), pp. 27768-27777, 2024.

Cheng, X., et al., "Hierarchical neural architecture search for deep stereo matching," Proceedings of Neural Information Processing Systems, (NeurIPS), 33:22158-22169, 2020.

Chollet, F., "Xception: Deep learning with depthwise separable convolutions," In Proceedings of the IEEE/CVF Conference on Computer Vision and Pattern Recognition (CVPR), pp. 1251-1258, 2017.

Chuah, W., et al., "ITSA: An information-theoretic approach to automatic shortcut avoidance and domain generalization in stereo matching networks," In Proceedings of the IEEE/CVF Conference on Computer Vision and Pattern Recognition (CVPR), pp. 13022-13032, 2022.

Dao, T., et al., "FlashAttention: Fast and memory-efficient exact attention with io-awareness," Proceedings of the Neural Information Processing System (NeurIPS), 35:16344-16359, 2022.

Banani, M., et al., "Probing the 3D awareness of visual foundation models," In Proceedings of the IEEE/CVF Conference on Computer Vision and Pattern Recognition (CVPR), pp. 21795-21806, 2024.

Geiger, A., et al., "Are we ready for autonomous driving? The KITTI vision benchmark suite," In Proceedings of the IEEE/CVF Conference on Computer Vision and Pattern Recognition (CVPR), pp. 3354-3361, 2012.

Gong, R., et al., "Learning intra-view and cross-view geometric knowledge for stereo matching," In Proceedings of the IEEE/CVF Conference on Computer Vision and Pattern Recognition (CVPR), pp. 20752-20762, 2024.

Guan, T., et al., "Neural Markov random field for stereo matching," In Proceedings of the IEEE/CVF Conference on Computer Vision and Pattern Recognition (CVPR), pp. 5459-5469, 2024.

Guo, W., et al., "Context-enhanced stereo transformer," In Proceedings of the European Conference on Computer Vision (ECCV), pp. 262-279, 2022.

Guo, X., et al., "Group-wise correlation stereo network," In Proceedings of the IEEE/CVF Conference on Computer Vision and Pattern Recognition (CVPR), pp. 3273-3282, 2019.

He, K., et al., "Deep residual learning for image recognition," In Proceedings of the IEEE/CVF Conference on Computer Vision and Pattern Recognition (CVPR), pp. 770-778, 2016.

Jing, J., et al., "Uncertainty guided adaptive warping for robust and efficient stereo matching," In Proceedings of the IEEE International Conference on Computer Vision (ICCV), pp. 3318-3327, 2023.

Karaev, N., et al., "DynamicStereo: Consistent dynamic depth from stereo videos," In Proceedings of the IEEE/CVF Conference on Computer Vision and Pattern Recognition (CVPR), pp. 13229-13239, 2023.

Ke, B., et al., "Repurposing diffusion-based image generators for monocular depth estimation," In Proceedings of the IEEE/CVF Conference on Computer Vision and Pattern Recognition (CVPR), pp. 9492-9502, 2024.

Kendall, A., et al., "End-to-end learning of geometry and context for deep stereo regression," In Proceedings of the IEEE International Conference on Computer Vision (ICCV), pp. 66-75, 2017.

Khazatsky, A., et al., "DROID: A large-scale in-the-wild robot manipulation dataset," arXiv preprint arXiv:2403.12945, 2024.

Kirillov, A., et al., "Segment anything," In Proceedings of the IEEE International Conference on Computer Vision (ICCV), pp. 4015-4026, 2023.

Leroy, V., et al., "Grounding image matching in 3D with MASt3R," arXiv preprint arXiv:2406.09756, 2024.

Li, J., et al., "Practical stereo matching via cascaded recurrent network with adaptive correlation," In Proceedings of the IEEE/CVF Conference on Computer Vision and Pattern Recognition (CVPR), pp. 16263-16272, 2022.

Li, Z., et al., "Revisiting stereo depth estimation from a sequence-to-sequence perspective with transformers," In Proceedings of the IEEE International Conference on Computer Vision (ICCV), pp. 6197-6206, 2021.

Lipson, L., et al., "RAFT-Stereo: Multilevel recurrent field transforms for stereo matching," In International Conference on 3D Vision (3DV), pp. 218-227, 2021.

Liu, B., et al., "GraftNet: Towards domain generalized stereo matching with a broad-spectrum and task-oriented feature," In Proceedings of the IEEE/CVF Conference on Computer Vision and Pattern Recognition (CVPR), pp. 13012-13021, 2022.

Liu, S., et al., "Grounding DINO: Marrying DINO with grounded pretraining for open-set object detection," In Proceedings of the European Conference on Computer Vision (ECCV), 2024.

Loshchilov, I., "Decouples weight decay regularization," ICLR, 2019.

Maaz, M., et al., "EdgeNext: Efficiently amalgamated cnn-transformer architecture for mobile vision applications," In Proceedings of the European Conference on Computer Vision (ECCV), pp. 3-20, 2022.

Mao, Y., et al., "UASNet: Uncertainty adaptive sampling network for deep stereo matching," In Proceedings of the IEEE International Conference on Computer Vision (ECCV). pp. 6311-6319, 2021.

Marr, D., et al., "Cooperative computation of stereo disparity," Science, 194:283-287, 1976.

Mayer, N., et al., "A large dataset to train convolutional networks for disparity, optical flow, and scene flow estimation," In Proceedings of the IEEE/CVF Conference on Computer Vision and Pattern Recognition (CVPR), pp. 4040-4048, 2016.

Menze, M., et al., "Object scene flow for autonomous vehicles," In Proceedings of the IEEE/CVF Conference on Computer Vision and Pattern Recognition (CVPR), pp. 3061-3070, 2015.

Oquab, M., et al., "DINOv2: Learning robust visual features without spervision," TMLR, 2024.

Radford, A., et al., "Learning transferable visual models from natural language supervision," In International Conference on Machine Learning (ICML), pp. 8748-8763, 2021.

Ramirez, P.Z., et al., "Booster: A benchmark for depth from images of spectacular and transparent surfaces," IEEE Transactions on Pattern Analysis and Machine Intelligence (PAMI), 2023.

Rao, Z., et al., "Masked representation learning for domain generalized stereo matching," In Proceedings of the IEEE/CVF Conference on Computer Vision and Pattern Recognition (CVPR), pp. 5435-5444, 2023.

Ravi, N., et al., "SAM 2: Segment anything in images and videos," arXiv preprint arXiv:2408.000714, 2024.

Scharstein, D., et al., "High-resolution stereo datasets with subpixel-accurate ground truth," In Pattern Recognition: 36th German Conference, GCPR 2014, Munster, Germany, Sep. 2-5, 2014, Proceedings 36, pp. 31-42, Springer, 2014.

Schops, T., et al., "A multi-view stereo benchmark with high-resolution images and multi-camera videos," In Proceedings of the IEEE/CVF Conference on Computer Vision and Pattern Recognition (CVPR), pp. 3260-3269, 2017.

(56)                      References Cited

OTHER PUBLICATIONS

Shen, Z., et al., "CFNet: Cascade and fused cost vol. for robust stereo matching," In Proceedings of the IEEE/CVF Conference on Computer Vision and Pattern Recognition (CVPR), pp. 13906-13915, 2021.

Shen, Z., et al., "PCW-Net: Pyramid combination and warping cost vol. for stereo matching," In Proceedings of the European Conference on Computer Vision (ECCV), pp. 280-297, 2022.

Shen, Z., et al., "Digging into uncertainty-based pseudo-label for robust stereo matching," arXiv preprint arXiv:2307.160509, Jul. 2023.

* cited by examiner

FOUNDATION MODEL FOR ZERO-SHOT STEREO MATCHING

CLAIM OF PRIORITY

This application claims the benefit of U.S. Provisional Application No. 63/726,916 titled "Synthetic Data Generation For Training Stereo Foundation Models," filed Dec. 2, 2024 and U.S. Provisional Application No. 63/723,727 titled "Foundation Model For Zero-Shot Stereo Matching," filed Nov. 22, 2024, the entire contents of which are incorporated herein by reference.

BACKGROUND

Recent stereo algorithms can achieve amazing results thanks to the proliferation of training datasets and advances in deep neural network architectures. Specifically, leading stereo networks construct cost volumes from unary features and leverage three-dimensional (3D) convolutional neural networks (CNNs) for cost filtering. In addition, refinement-based methods iteratively refine the disparity map based on recurrent modules such as Gated Recurrent Units (GRUs). However, despite conventional stereo algorithms performing successfully on public benchmarks under per-domain fine-tuning step, conventional stereo algorithms struggle to gather non-local information to effectively scale to larger datasets. In other words, to obtain competitive results, fine-tuning on the dataset of the target domain is still the method of choice for conventional stereo algorithms. For example, initially, the conventional stereo algorithms may be trained using a training dataset in an initial domain (e.g., scenes of a room). However, during inference, when attempting to use the conventional stereo algorithms on a target domain (e.g., scenes of a park or manufacturing line), conventional stereo algorithms might not be able to achieve adequate results. As such, after performing the initial training of the conventional stereo algorithms, additional training (e.g., fine-tuning) using a dataset within the target domain is performed for the conventional stereo algorithms to achieve adequate results. But, given the zero-shot generalization ability shown in other applications within computer vision (e.g., the ability to train a model without using the fine-tuning phase), it may be desirable to perform zero-shot stereo matching such that fine-tuning for each particular domain is not required. As such, there is a need for addressing these issues and/or other issues associated with the prior art.

SUMMARY

Embodiments of the present disclosure relate to a foundation model for zero-shot stereo matching. Systems and methods are disclosed that relate to describe a foundation model (e.g., a Foundational Stereo Model) for stereo depth estimation that achieves strong zero-shot generalization without per-domain fine-tuning. For instance, tremendous progress has been made in deep stereo matching to excel on benchmark datasets through per-domain fine-tuning. However, achieving strong zero-shot generalization—a hallmark of foundation models in other computer vision tasks—remains challenging for stereo matching. Accordingly, embodiments of the present disclosure may utilize a foundation model (e.g., a Foundational Stereo Model) for stereo depth estimation that is configured to achieve strong zero-shot generalization. To this end, embodiments of the present disclosure construct a large-scale (e.g., one million stereo pairs) synthetic training dataset featuring large diversity and high photorealism, followed by an automatic self-curation pipeline to remove ambiguous samples. Then, a number of network architecture components are configured to enhance scalability, including a side-tuning feature backbone (e.g., a side-tuning adapter (STA)) that adapts rich monocular priors from vision foundation models to mitigate the sim-to-real gap, and long-range context reasoning for effective cost volume filtering (e.g., an attentive hybrid cost filtering (AHCF)). Together, these components lead to strong robustness and accuracy across domains, establishing a new standard in zero-shot stereo depth estimation.

In some examples, embodiments of the present disclosure describe a Foundational Stereo Model that includes STAs to generate an initial hybrid cost volume. The STAs may utilize a monocular depth estimation model and a side-tuning CNN. Furthermore, the initial hybrid cost volume is generated based on a group correlation cost volume and a concatenation cost volume. Additionally, and/or alternatively, the Foundational Stereo Model further includes an AHCF that generates a filtered hybrid cost volume based on the initial hybrid cost volume. The AHCF includes a first branch for the spatial dimensions and a second branch for the disparity dimensions. Additionally, and/or alternatively, the Foundational Stereo Model also includes a refinement block that utilizes convolutional GRUs (ConvGRUs) blocks to iteratively refine an initial disparity map to generate an output disparity map.

In an embodiment, a computer-implemented method for using a Foundational Stereo Model to generate an output disparity map is provided. The method comprises processing a first stereo image using a first side-tuning adapter (STA) to generate a first feature map associated with the first stereo image and processing a second stereo image using a second STA to generate a second feature map associated with the second stereo image. The method also comprises generating an initial hybrid cost volume based on the first feature map and the second feature map and processing the initial hybrid cost volume using attentive hybrid cost filtering (AHCF) to generate a filtered hybrid cost volume. The method further comprises generating the output disparity map based on the filtered hybrid cost volume.

BRIEF DESCRIPTION OF THE DRAWINGS

The present systems and methods for a foundation model for zero-shot stereo matching are described in detail below with reference to the attached drawing figures.

DETAILED DESCRIPTION

Figure 1A:
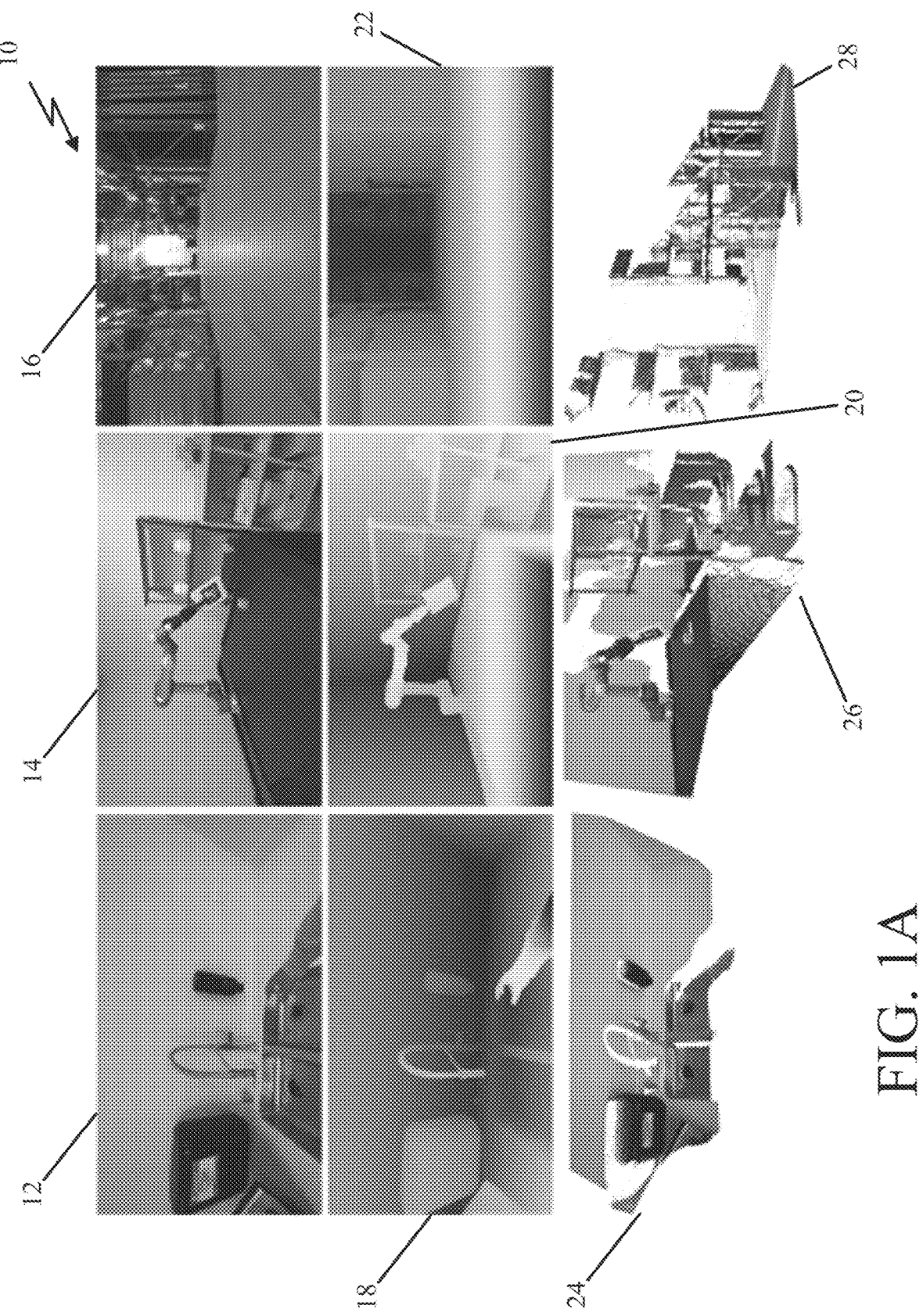
FIG. 1A illustrates representations of using the Foundational Stereo Model, in accordance with an embodiment.

Systems and methods are disclosed herein that relate to a foundation model for zero-shot stereo matching, and in particular, to using a Foundational Stereo Model to generate an output disparity map. For instance, stereo matching algorithms have improved significantly since their introduction nearly half a century ago. Recent stereo algorithms can achieve amazing results, almost saturating the most challenging benchmarks-thanks to the proliferation of training datasets and advances in deep neural network architectures. Yet, fine-tuning on the dataset of the target domain is still the method of choice to obtain competitive results. Given the zero-shot generalization ability shown on other problems within computer vision via the scaling law, a question arises as to what prevents stereo matching algorithms from achieving a similar level of generalization.

Leading conventional stereo networks construct cost volumes from the unary features and leverage three-dimensional (3D) CNNs for cost filtering. Refinement-based methods iteratively refine the disparity map based on recurrent modules such as GRUs. Despite their success on public benchmarks under per-domain fine-tuning setup, however, they struggle to gather non-local information to effectively scale to larger datasets. Other methods explore transformer architectures for unary feature extraction, while lacking the specialized structure afforded by cost volumes and iterative refinement to achieve high accuracy.

Such limitations have, to date, hindered the development of a stereo network that generalizes well to other domains. While it is true that cross-domain generalization has been explored by some conventional approaches, such approaches have not achieved results that are competitive with those obtained by fine-tuning on the target domain, either due to insufficient structure in the network architecture, impoverished training data, or both. These networks are generally experimented on a rather small dataset with only 40,000 annotated training image pairs. As a result, none of these methods may be used as an off-the-shelf solution, as opposed to the strong generalizability of vision foundation models that have emerged in other tasks.

To address these limitations, embodiments of the present disclosure describe a Foundational Stereo Model, which is a large foundation model for stereo depth estimation that achieves strong zero-shot generalization without per-domain fine-tuning. Embodiments of the present disclosure may train the network on a large-scale high-fidelity synthetic training dataset with high diversity and photorealism. An automatic self-curation pipeline may be developed to eliminate the ambiguous samples that are inevitably introduced during the domain randomized data generation process, improving both the dataset quality and model robustness over iterate updates. To mitigate the sim-to-real gap, embodiments of the present disclosure include a side-tuning feature backbone that adapts internet-scale rich priors from a model that is trained on real monocular images to the stereo setup. To effectively leverage these rich monocular priors embedded into the 4D cost volume, embodiments of the present disclosure further include an Attentive Hybrid Cost Volume (AHCF) module, consisting of 3D Axial-Planar Convolution (APC) filtering and a Disparity Transformer (DT). The APC filtering may decouple the standard 3D convolution into two separate spatial-oriented and disparity-oriented 3D convolutions, enhancing the receptive fields for volume feature aggregation. The DT may perform self-attention over the entire disparity space within the cost volume, providing long range context for global reasoning. Together, these may significantly enhance the representation, leading to better disparity initialization, as well as more powerful features for the subsequent iterative refinement process.

As will be described in further detail below, embodiments of the present disclosure describe a Foundational Stereo Model, which is a zero-shot generalizable stereo matching model that achieves comparable or even more favorable results to conventional models fine-tuned on a target domain. The Foundational Stereo Model may also significantly outperform conventional methods and models when applied to in-the-wild data. Embodiments of the present disclosure further create a large-scale high-fidelity synthetic dataset for stereo learning with high diversity and photorealism and a self-curation pipeline to ensure that bad samples are pruned. To harness internet-scale knowledge containing rich semantic and geometric priors, the Foundational Stereo Model includes an STA that adapts the video transformer-based monocular depth estimation model to the stereo setup. The Foundational Stereo Model may further include an AHCF, which includes an hourglass module with 3D APC and a DT module that performs full self-attention over the disparity dimension.

Prior to describing the Foundational Stereo Model in more detail, images, disparity maps, and point clouds are first shown and described. For example, FIG. 1A illustrates representations of using the Foundational Stereo Model, in accordance with an embodiment. For example, FIG. 1A shows three red, green, blue (RGB) images 12-16 (e.g., left RGB images). Following, the RGB images 12-16 may be processed by the Foundational Stereo Model to generate three disparity maps 18-22. Then, the three disparity maps 18-22 may be used to generate the metric point clouds 24-28.

Figure 1B:
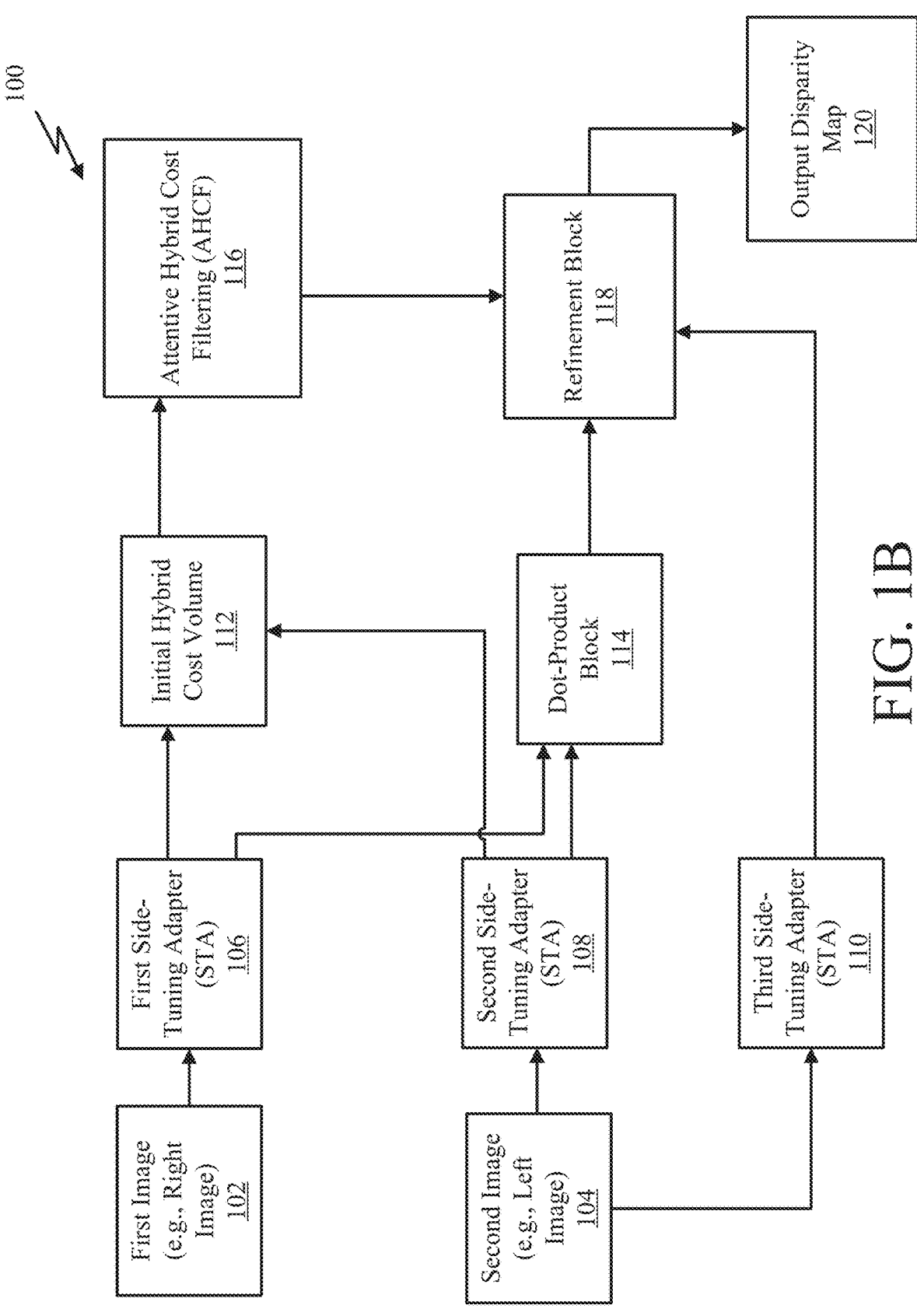
FIG. 1B illustrates an overview of the Foundational Stereo Model, in accordance with an embodiment.

FIG. 1B illustrates an overview 100 of the Foundational Stereo Model, in accordance with an embodiment. Each block of the overview 100, described herein, may comprise a computing process that may be performed using any combination of hardware, firmware, and/or software. For instance, various functions may be carried out by a processor executing instructions stored in memory. The overview 100 may also be embodied as computer-usable instructions stored on computer storage media. The overview 100 may be provided by a standalone application, a service or hosted service (standalone or in combination with another hosted service), or a plug-in to another product, to name a few. In addition, the overview 100 is described, by way of example, with respect to a computing system and/or platform. However, this overview 100 may additionally or alternatively be executed by any one system, or any combination of systems, including, but not limited to, those described herein. Furthermore, persons of ordinary skill in the art will understand that any system that performs the overview 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

In addition, one or more computing systems or computing platforms may be used to perform one or more blocks of the overview 100. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location.

In some embodiments, the Foundational Stereo Model may include three major aspects—the STAs (e.g., the first STA 106, the second STA 108, and the third STA 110), the AHCF 116, and the refinement block 118 that uses ConvGRUs. In particular, based on obtaining a first image 102 (e.g., a right stereo image of a scene) and a second image 104 (e.g., a left stereo image of the scene), the Foundational Stereo Model, which may include the first and second STAs 106 and 108, the AHCF 116, and the refinement block 118, may generate an output disparity map 120 (e.g., the disparity maps 18-22 shown in FIG. 1A).

For example, a first image 102 (e.g., right stereo image) and a second image 104 (e.g., left stereo image) may be obtained. The second image 104 may be the images 12-16 shown in FIG. 1A and the first image 102 may be another image of the same scene, but may be obtained by an image capturing device (e.g., a camera) that is displaced from the image capturing device that obtains the second image 104. The first and second images 102-104 may be processed by the first and second STAs 106-108, which are shown in FIG. 1C, to generate feature maps for the first image 102 and the second image 104.

For instance, the Foundational Stereo Model may include three STAs 106, 108, and 110. The first and second STAs 106 and 108 may be used to generate feature maps for the first image 102 and the second image 104. The third STA 110 may be and/or include a context network and used to generate context features associated with the second image 104. The context features may be used by the refinement block 118. The first and second STAs 106 and 108 are described in further detail in FIG. 1C. The third STA 110 is described in afterwards when describing the inputs to the refinement block 118.

Figure 1C:
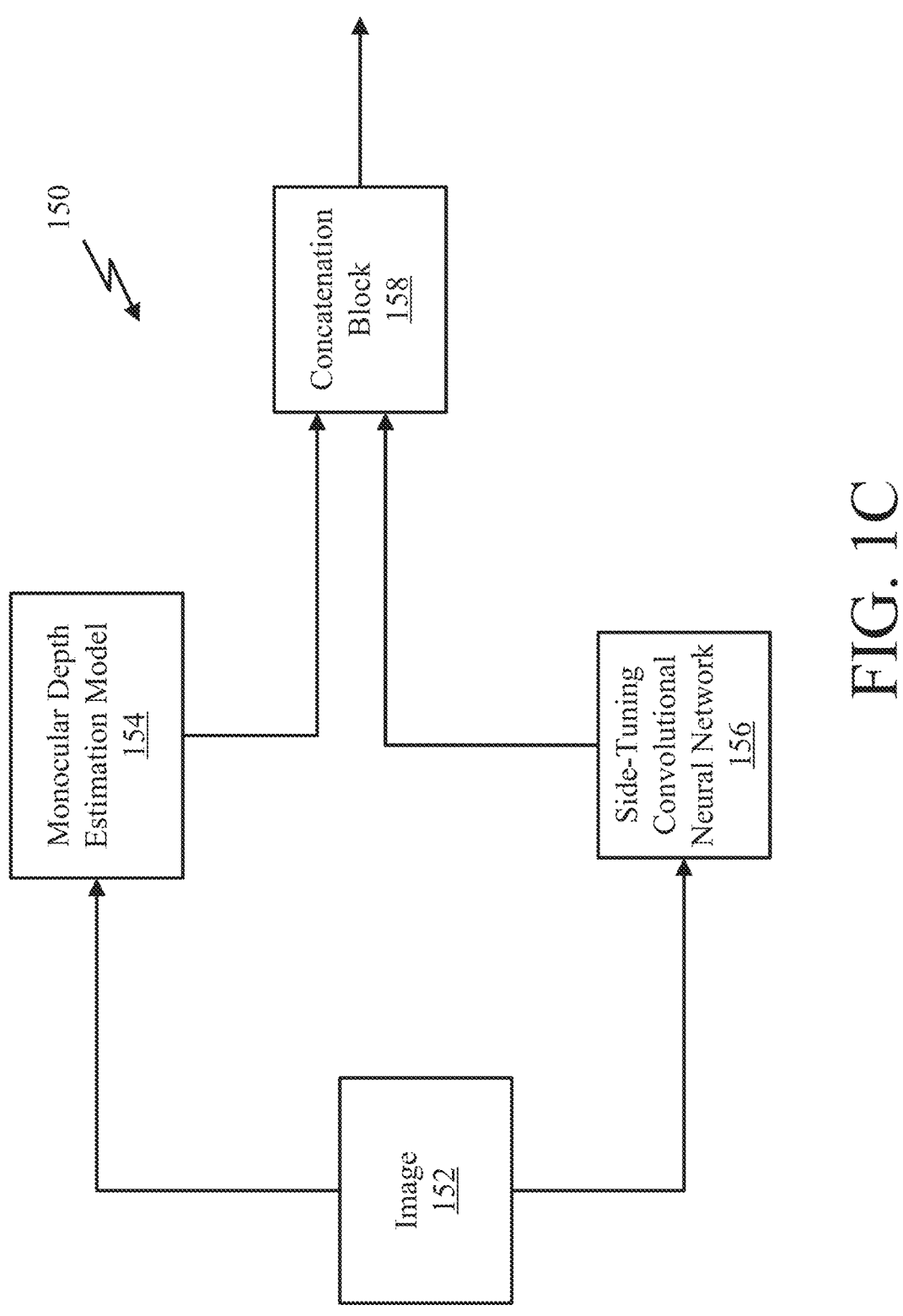
FIG. 1C below shows an overview of an example STA that includes a monocular depth estimation model, a side-tuning CNN, and a concatenation block, in accordance with an embodiment.

FIG. 1C below shows an overview 150 of an example STA that includes a monocular depth estimation model 154, a side-tuning CNN 156, and a concatenation block 158, in accordance with an embodiment. For example, the image 152 may be the right image 102 or the left image 104 from FIG. 1B. The STA of FIG. 1C (e.g., the first or second STAs 106 and 108 of FIG. 1B) may include two models 154 and 156 that may each process the image 152. For instance, the monocular depth estimation model 154 may process the image 152 to generate monocular depth features. Further, the side-tuning CNN 156, which may be a pyramid CNN, may also process the image 152 to generate CNN pyramid features. The concatenation block 158 may concatenate the CNN pyramid features and the monocular depth features to generate a feature map, which is output from the STA.

In other words, the STA may utilize a vision transformer (ViT) and a CNN network to generate feature maps from the images. For instance, the ViT (e.g., the monocular depth estimation model 154) may be trained on internet-scale real data and while the ViT may operate adequately on typical images, the ViT may have difficulty on stereo images. As such, the CNN network (e.g., the side-tuning CNN 156) is used to adapt the ViT-based monocular depth estimation network (e.g., the monocular depth estimation model 154) for the stereo setup, which thus synergizes the strengths of both CNN and ViT architectures.

The monocular depth estimation model 154 may be any monocular depth estimation model such as, but not limited to, a DepthAnythingV2 model, which is described in Yang et al. "Depth anything v2." In *Proceedings of Neural Information processing Systems (NeurIPS)*, 2024 and is incorporated by reference herein. The monocular depth estimation model 154 may generate monocular depth features indicating monocular depth estimations (e.g., estimating a depth value of a pixel) of a single monocular RGB image (e.g., the image 152).

The side-tuning CNN 156 may be any type of pyramid CNN such as, but not limited to, the EdgeNeXt-S model, which is described in Maaz et al. "EdgeNeXt: Efficiently amalgamated cnn-transformer architecture for mobile vision applications." In *Proceedings of the European Conference on Computer Vision (ECCV)*, pages 3-20, 2022 and is incorporated by reference herein. The side-tuning CNN 156 may generate CNN pyramid features. For example, the side-tuning CNN 156 may apply a 4×4 convolution with a stride of 4 to downscale the features from the image 152.

As such, the CNN pyramid features may indicate a height (H) and width (W) associated with the image 152 (e.g., a height and width that is divided by four given the 4×4 convolution with the stride of 4), and may further indicate the channels (C) (e.g., the features). Following, in embodiments using the DepthAnything V2 model and due to the dimensions of the CNN pyramid features, a downsampling block may be included within or separate from the monocular depth estimation model 154 that downsamples the monocular depth features to achieve similar dimensions to the CNN pyramid features. Then, the concatenation block 158 concatenates the monocular depth features and the CNN pyramid features to generate a feature map for the image 152.

In other words, to mitigate the simulation-to-real gap when the stereo network is primarily trained on synthetic dataset, the Foundational Stereo Model may use an STA that leverages the recent advancements on monocular depth estimation trained on internet-scale real data. For instance, embodiments of the present disclosure may use a CNN network (e.g., the side-tuning CNN 156) to adapt the ViT-based monocular depth estimation network (e.g., the monocular depth estimation model 154) to the stereo setup, thus synergizing the strengths of both CNN and ViT architectures.

In some embodiments, the STA may use the feature pyramids from a frozen DepthAnythingV2 model without using the CNN features. Additionally, and/or alternatively, the STA may use a ViT-adapter such as the ViT-adapted described in Chen et al. "Vision transformer adapter for dense predictions." In *ICLR*, 2023 and is incorporated by reference herein.

Additionally, and/or alternatively, the STA may use the monocular depth estimation model 154 (e.g., the Depth- AnythingV2 model) and the side-tuning CNN 156 (e.g., the EdgeNeXt-S model) that is described above. For instance, given a pair of left and right images $I_l$, $I_r \in \mathbb{R}^{H \times W \times 3}$, the side-tuning CNN 156 (e.g., an EdgeNeXt-S model) may be used within the STA (e.g., the STAs 106 and 108) to extract multi-level pyramid features, where the ¼ level feature is equipped with the monocular depth estimation model's 154 features:

$$f_l^{(i)}, f_r^{(i)} \in \mathbb{R}^{C_i \times \frac{H}{i} \times \frac{W}{i}},$$

$i \in \{4,8,16,32\}$. The EdgeNeXt-S model may be chosen for the side-tuning CNN 156 for its memory efficiency and because larger CNN backbones were shown to not yield additional benefits based on experimentation. When forwarding to the monocular depth estimation model 154, the image may be first resized to be divisible by 14, to be consistent with its pretrained patch size. The STA weights may be shared when applied to $I_l$, $I_r$ (e.g., the weights of the STAs 106 and 108 may be shared).

Returning to FIG. 1B, the first STA 106 may generate a right feature map $$f_r^{(4)}$$

for the right image 102 and the second STA 108 may generate a left feature map $$f_l^{(4)}$$

for the left image 104. The right and left feature maps $$f_r^{(4)}, f_l^{(4)}$$

may be defined as follows:

$$f_l^{(4)}, f_r^{(4)} \in \mathbb{R}^{C_4 \times \frac{H}{4} \times \frac{W}{4}}$$

Therefore, the side-tuning CNN 156 may be learned to adapt the ViT features (e.g., the monocular depth features from the monocular depth estimation model 154) to the stereo matching task. Subsequently, based on the right and left feature maps $$f_r^{(4)}, f_l^{(4)},$$

the initial hybrid cost volume $V_c$ 112 may be determined. The initial hybrid cost volume $V_c$ 112 may be based on a group correlation cost volume $V_{gwc}$ and a concatenation cost volume $V_{cat}$.

For example, determining the group correlation cost volume $V_{gwc}$ using the right and left feature maps may be based on:

$$V_{gwc}(g, d, h, w) = \langle \hat{f}_{l,g}^{(4)}(h, w), \hat{f}_{r,g}^{(4)}(h, w - d) \rangle$$

where $\hat{f}$ denotes the $L_2$ normalized feature that is used for better training stability, $\langle \cdot, \cdot \rangle$ represents a dot product, g is the group index among the total G feature groups (e.g., G=8 feature groups) that the total features from the right and left feature maps are divided into, and d is the disparity index where $$d \in \left\{ 1, 2, \ldots, \frac{D}{4} \right\},$$

and D is the maximum pre-defined disparity. For instance, D is a predefined maximum disparity at the original input image resolution, which may be based on the focal length of the image capturing device and a user set minimum depth that the user selects to observe. For instance, D may be divided by 4 here, since the feature maps are all at the ¼ of the original image resolution as described above. As such, d may be iterated from 1 to $$\frac{D}{4},$$

and at each d, a dot-product may be performed between the left grouped features (e.g., at [h,w]) and right grouped features (e.g., at [h,w−d]).

Similarly, using the right and left feature maps, the concatenation cost volume $V_{cat}$ may be obtained based on:

$$V_{cat}(d, h, w) = \left[ Conv\left(f_l^{(4)}\right)(h, w), Conv\left(f_r^{(4)}\right)(h, w - d) \right]$$

where $[\cdot, \cdot]$ denotes concatenation along the channel dimension of the feature maps. For example, d may be iterated from 1 to $$\frac{D}{4},$$

and at each d, a concatenation may be performed for the left grouped features (e.g., at [h,w]) and right grouped features (e.g., at [h,w−d]) features after one layer of convolution.

After obtaining the group correlation cost volume $V_{gwc}$ and the concatenation cost volume $V_{cat}$, the initial hybrid cost volume $V_c$ 112 may be determined based on concatenating the group correlation cost volume $V_{gwc}$ and the concatenation cost volume $V_{cat}$. This may be shown by the below expression:

$$V_c(d, h, w) = [V_{gwc}(d, h, w), V_{cat}(d, h, w)]$$

where $V_c$ may be a four-dimensional (4D) data structure (e.g., $$V_c \in \mathbb{R}^{C \times \frac{D}{4} \times \frac{H}{4} \times \frac{W}{4}}).$$

For instance, $V_c$ may have a channel dimension C, a disparity dimension a height dimension $$\frac{D}{4},$$

a height dimension $$\frac{H}{4},$$

and a width dimension $$\frac{W}{4}.$$

The denominator of the disparity, height, and width dimensions being "4" is merely exemplary and may be based on the side-tuning CNN 156 (e.g., based on applying a 4×4 convolution with a stride of 4 to downscale the features from the image).

In other words, based on the right and left feature maps from the STAs 106 and 108, the group correlation cost volume $V_{gwc}$ may be determined using a dot product of the right and left feature maps and the concatenation cost volume $V_{cat}$ may be determined using a concatenation operation of the right and left feature maps. Subsequently, the concatenation cost volume $V_{cat}$ and the group correlation cost volume $V_{gwc}$ may be concatenated to obtain the initial hybrid cost volume 112. Thus, based on using the dot product and the concatenations, the group correlation cost volume $V_{gwc}$ may harness the strengths of conventional correlation-based matching costs, which offers a diverse set of similarity measurement features from each group, and the concatenation cost volume $V_{cat}$ may preserve the unary features including the rich monocular priors based on concatenating the left and right feature maps at a shifted disparity. The initial hybrid cost volume 112 may be provided to the AHCF 116, which is described in further detail in FIG. 2A.

To put it another way, embodiments of the present disclosure may utilize a hybrid cost volume construction. For example, given unary features at ¼ scale $$f_l^4, f_r^4$$

extracted from the STAs 106 and 108, the cost volume $$V_C \in \mathbb{R}^{C \times \frac{D}{4} \times \frac{H}{4} \times \frac{W}{4}}$$

may be constructed with a combination of group-wise correlation and concatenation:

$$V_{gwc}(g, d, h, w) = \left\langle \hat{f}_{l,g}^{(4)}(h, w), \hat{f}_{r,g}^{(4)}(h, w - d) \right\rangle,$$

$$V_{cat}(d, h, w) = \left[ Conv\left(f_l^{(4)}\right)(h, w), Conv\left(f_r^{(4)}\right)(h, w - d) \right],$$

$$V_C(d, h, w) = \left[ V_{gwc}(d, h, w), V_{cat}(d, h, w) \right]$$

where $\hat{f}$ denotes $L_2$ normalized feature for better training stability; $\langle \cdot, \cdot \rangle$ represents dot product; $g \in \{1, 2, \ldots, G\}$ is the group index among the total G=8 feature groups that the total features are evenly divided into;

$$d \in \left\{ 1, 2, \ldots, \frac{D}{4} \right\}$$

is the disparity index. $[\cdot, \cdot]$ denotes concatenation along channel dimension. The group-wise correlation $V_{gwc}$ harnesses the strengths of conventional correlation-based matching costs, offering a diverse set of similarity measurement features from each group. $V_{cat}$ preserves unary features including the rich monocular priors by concatenating left and right features at shifted disparity. In some examples, to reduce memory consumption, embodiments of the present disclosure may linearly downsize the unary feature dimension to 14 using a convolution of kernel size of 1 (e.g., weights are shared between $$f_l^4 \text{ and } f_r^4)$$

before concatenation.

Figure 2A:
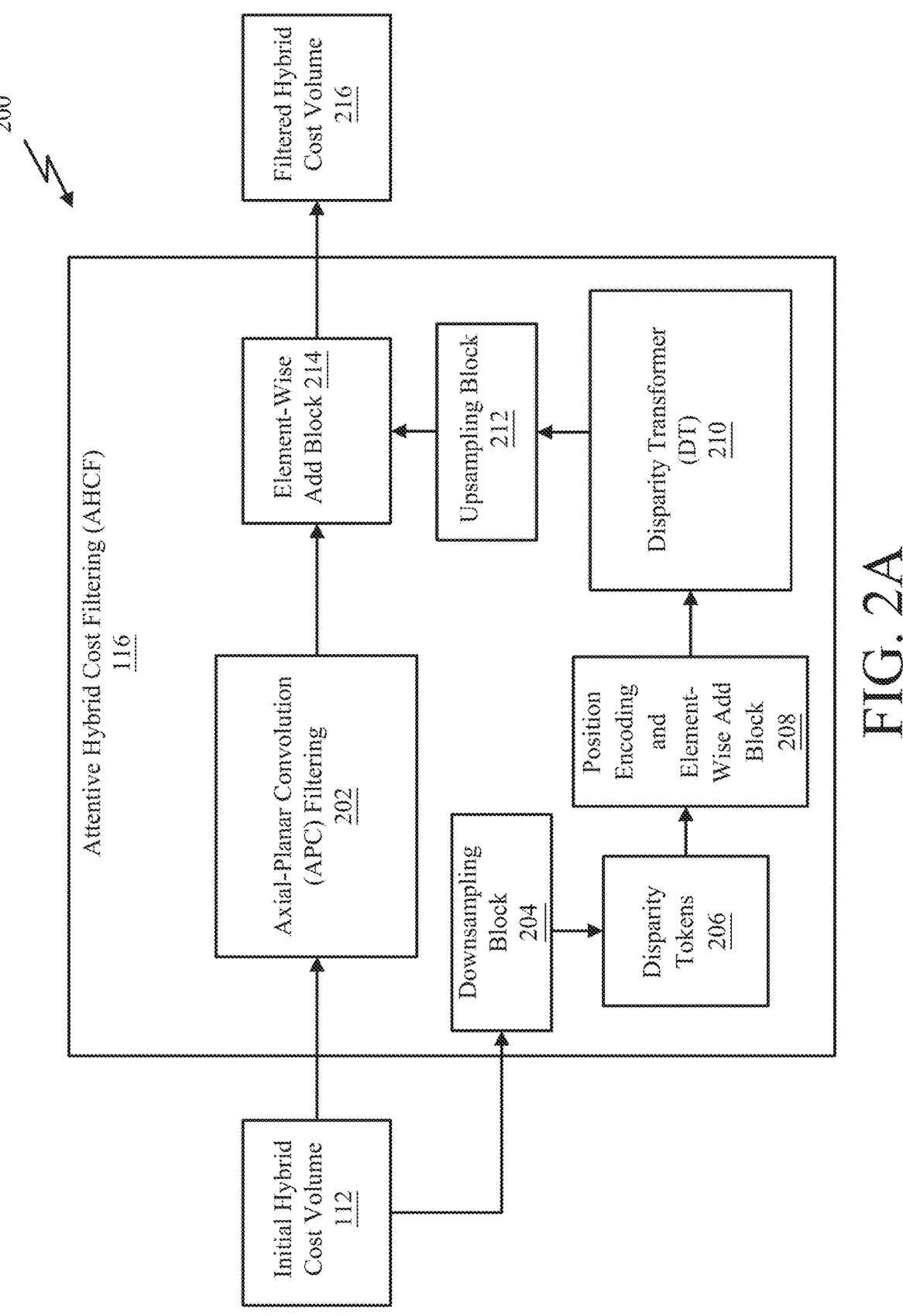
FIG. 2A shows an overview of using the AHCF to generate a filtered hybrid cost volume, in accordance with an embodiment.

FIG. 2A shows an overview 200 of using the AHCF 116 to generate a filtered hybrid cost volume 216, in accordance with an embodiment. For example, the initial hybrid cost volume 112 is provided to the APC filtering 202 and the downsampling block 204. Specifically, similar to the STAs 106-110, the AHCF 116 uses two branches that also utilizes the advantages of both a transformer architecture (e.g., the DT 210) and the CNN architecture (e.g., the APC filtering 202). For example, while 3D convolutions of kernel size 3×3×3 are commonly used for relatively small disparity sizes, it was observed that these 3D convolutions struggle with larger disparities when applied to high resolution images. In addition, due to the intensive memory consumption, it was observed to be impractical to naively increase the kernel size (e.g., setting the kernel size to 5×5×5 results in unmanageable memory usage on an 80 gigabyte (GB) graphics processing unit (GPU))

Therefore, the AHCF 116 uses two branches that separate the two convolutions: one over the spatial dimensions and the other over disparity. For example, the APC filtering 202 may perform convolutions over the spatial dimensions (e.g., the height (H) and the width (W)) of the initial hybrid cost volume 112. As such, based on processing the initial hybrid cost volume 112 using the APC filtering 202 and performing convolutions, the APC filtering 202 may generate an APC output. The APC filtering 202 may be an hourglass neural network such as a U-Net that performs 3D convolutions. For instance, the APC filtering 202 may include three downsampling blocks and three up-sampling blocks with residual connections. The APC filtering 202 may perform cost volume filtering of the initial hybrid cost volume 112 to generate the APC output.

In addition to generating the APC output, convolutions may further be performed over the disparity dimensions. For instance, disparity tokens 206 may be obtained based on using the downsampling block 204 to downsample the initial hybrid cost volume 112. For instance, the downsampling block 204 may apply a 3D convolution of kernel size 4×4×4 with a stride of 4 to downsize the initial hybrid cost volume 112. Then, the downsampled initial hybrid cost volume may

| be reshaped into a batch of token sequences, each with the length of the disparity. In other words, the downsampling block 204 may perform downsampling to obtain a smaller cost volume that is more manageable for the DT 210 to process. Thus, while the channel dimension might not change, the disparity, width, and height dimensions may change to be $$\frac{D}{16}, \frac{W}{16}, \text{and } \frac{H}{16}.$$

Subsequently, the downsampled initial hybrid cost volume may be reshaped such that each disparity token 206 may be associated with a height and width, and may have the dimensions of the channel (C) and the disparity. For instance, for a 512×512 image, there may be 1024 disparity tokens and each token would have a length of the disparity dimension and include the channel features from the channel dimension.

Afterwards, the position encoding and element-wise add block 208 may perform position encoding for the disparity tokens 206. For instance, the disparity tokens 206 might not have any positioning information (e.g., positioning information indicating the relationship between the disparity tokens 206 and locational information from the original left and/or right images 102, 104). As such, the position encoding and element-wise add block 208 may include or add positioning information associated with the original left and/or right images 102, 104 to the disparity tokens 206. Subsequently, the disparity tokens 206 with the positioning information may be provided to the DT 210.

The DT 210 may be any type of transformer architecture. For instance, in some embodiments, the DT 210 may include one or more layers and each layer may include a self-attention block, an add & norm block, a feed forward block, and another add & norm block. In some instances, the DT 210 may include four layers and each layers may include the four blocks described above. The DT 210 may process the disparity tokens 206 with the positioning information and generate a DT output.

In some examples, each layer of the DT 210 may include a flash self-attention block such as the flash self-attention block that is described in Dao et al. "FlashAttention: Fast and memory-efficient exact attention with io-awareness." In *Proceedings of Neural Information Processing Systems (NeurIPS)*, 35:16344-16359, 2022, which is incorporated by reference herein. By using the flash self-attention block, additional advantages may be achieved such as reducing memory consumption and obtaining a faster compute speed. For instance, the flash self-attention block may include and/or utilize a separate library that results in a more advanced implementation of the Foundational Stereo Model.

The upsampling block 212 may perform upsampling of the DT output. For instance, given the downsampling block 204 and prior to performing an element-wise add, the upsampling block 212 may perform upsampling such that the upsampled DT output is the same size as the APC output from the APC filtering 202. For instance, the upsampling block 212 may perform trilinear interpolation. Subsequently, the element-wise add block 214 sums the APC Output from the APC filtering 202 with the upsampled DT output to generate the filtered hybrid cost volume 216, which is output from the AHCF 116.

In other words, the AHCF 116 may include the APC filtering 202 and the DT 210. The APC filtering 202 may be and/or include an hourglass network comprising 3D convolutions, with three downsampling blocks and three up-sampling blocks with residual connections. The APC filtering 202 may be leveraged for cost volume filtering. While 3D convolutions of kernel size 3×3×3 are commonly used for relatively small disparity sizes, it was observed that it struggles with larger disparities when applied to high resolution images, especially since the disparity dimension is expected to model the probability distribution for the initial disparity prediction. However, it is impractical to naively increase the kernel size, due to the intensive memory consumption. Therefore, the AHCF 116 and the APC filtering 202 utilizes APC, which decouples a single 3×3×3 convolution into two separate convolutions: one over spatial dimensions (kernel size $K_s \times K_s \times 1$) and the other over disparity ($1 \times 1 \times K_d$), each followed by batch normalization (BatchNorm) and rectified linear unit (ReLU) operations. The AHCF 116 may be regarded, in some embodiments, as a 3D version of Separable Convolution with the difference that the spatial and disparity dimensions are separated without subdividing the channel into groups, which sacrifices representation power. The disparity dimension may be specially treated due to its uniquely encoded feature comparison within the cost volume. The APC may be used wherever possible in the hourglass network except for the downsampling and upsampling layers.

Regarding the DT 210, while conventional approaches introduced a transformer architecture to unary feature extraction step to scale up stereo training, the cost filtering process is often overlooked, which remains an essential step in achieving accurate stereo matching by encapsulating correspondence information. Therefore, the DT 210 is introduced to further enhance the long-range context reasoning within the four-dimensional (4D) cost volume. Given the initial hybrid cost volume $V_c$ 112, the AHCF 116 applies a 3D convolution of kernel size 4×4×4 with stride 4 to downsize the cost volume. Then, the AHCF 116 reshapes the volume into a batch of token sequences (e.g., the disparity tokens 206 that are obtained based on the downsampling block 204), each with length of disparity. Position encoding is applied before feeding it to a series of transformer encoder blocks (e.g., four transformer encoder blocks), where FlashAttention may be leveraged to perform multi-head self-attention. The process may be written as:

$$Q_0 = PE(R(Conv_{4\times4\times4}(V_C))) \in \mathbb{R}\left(\frac{H}{16} \times \frac{W}{16}\right) \times C \times \frac{D}{16}$$

$$MultiHead(Q, K, V) = [head_1, \dots, head_h]W_O$$

$$\text{where } head_i = FlashAttention(Q_i, K_i, V_i)$$

$$Q_1 = Norm(MultiHead(Q_0, Q_0, Q_0) + Q_0)$$

$$Q_2 = Norm(FFN(Q_1) + Q_1)$$

where R(•) denotes reshape operation; PE(•) represents position encoding; [·,·] denotes concatenation along the channel dimension; $W_O$ is linear weights. The number of heads is h=4 in some examples. Finally, the output from the DT 210 is up-sampled (e.g., using the upsampling block 212) to the same size as initial hybrid cost volume $V_c$ 112 using trilinear interpolation and summed with the hourglass output (e.g., the output from the APC filtering 202) using the element-wise add block 214 to obtain the filtered hybrid cost volume 216. The filtered hybrid cost volume 216 is then output from the AHCF 116.

Returning to FIG. 1B, three inputs are provided the refinement block 118. The first input may be the output of the AHCF 116, which may be the filtered hybrid cost volume 216 that is described above. In addition, the dot-product block 114 may perform a dot product of the left and right feature maps from the right and left images 102, 104 to generate a correlation cost volume $V_{corr}$. For example, a dot product may be performed on the right feature map from the first STA 106 and the left feature map from the second STA 108 to generate the correlation cost volume $V_{corr}$.

In addition, the third STA 110 may be used to extract context features from one of the images (e.g., the second image 104 shown in FIG. 1B). For instance, the third STA 110 may include a CNN (e.g., a context network) that may be similar to the side-tuning CNN 156 of the STAs 106 and 108, a monocular depth estimation model that may be similar (and/or the same) as the monocular depth estimation model 154 of the STAs 106 and 108, and a concatenation block that may be the same as the concatenation block 158 of the STAs 106 and 108. However, the side-tuning CNNs 156 of the STAs 106 and 108 may share weights during training whereas the CNN of the third STA 110 may be trained with different weights. The CNN of the third STA 110 may generate context features based on the second image 104. For instance, even though the training is different, the CNN of the third STA 110 may function similarly to the side-tuning convolutional neural network 156 of FIG. 1C for the STAs 106 and 108. But, instead of generating CNN pyramid features, the CNN of the third STA 110 may generate context features associated with the second image 104. The context features may be provided to a concatenation block. Furthermore, the monocular depth estimation model of the third STA 110 may generate monocular depth features, which may also be provided to the concatenation block. The concatenation block may concatenate the monocular depth features and the context features to generate a context feature map $$f_c^{(4)}.$$

In other words, whereas the second STA 108 utilizes a monocular depth estimation model 154 and a side-tuning CNN 156 to generate a left feature map $$f_l^{(4)},$$

the concatenation block of the third STA 110 and a side-tuning CNN 156 to generate a left feature map estimation model and the output from the CNN to generate the context feature map $$f_c^{(4)}.$$

The context feature map $$f_c^{(4)}$$

may be provided as the third input to the refinement block 118. For instance, the context feature map $$f_c^{(4)}$$

may be used to initialize the hidden state of the ConvGRUs at each iteration, which effectively guides the iterative process with progressively refined contextual information.

In other words, in some embodiments, the third STA 110 may be used to extract context feature, with the difference that the CNN module of the third STA 110 may be designed with a sequence of residual blocks and down-sampling layers. The third STA 110 may generate context features of multiple scales:

$$f_c^{(i)} \in \mathbb{R}^{C_i \times \frac{H}{i} \times \frac{W}{i}},$$

$i \in \{4,8,16\}$. The context feature map $f_c$ may participate in initializing the hidden state of the ConvGRU blocks described below and inputting to the ConvGRU block at each iteration. This may effectively guide the iterative process with progressively refined contextual information.

In some examples, the third STA 110 might not include a monocular depth estimation model and may instead may receive an input from the second STA 108. Specifically, the monocular depth estimation model 154 of the second STA 108 may provide monocular depth features to the concatenation block of the second STA 108 and also to the concentration block of the third STA 110. The concatenation block of the third STA 110 may concatenate the monocular depth features and the context features to generate the context feature map $$f_c^{(4)}.$$

As such, the refinement block 118 obtains three inputs— the context feature map $$f_c^{(4)},$$

the correlation cost volume $V_{corr}$, and the filtered hybrid cost volume 216. Based on processing the three inputs, the refinement block 118 outputs an output disparity map 120. The refinement block 118 is described further in FIG. 2B.

Figure 2B:
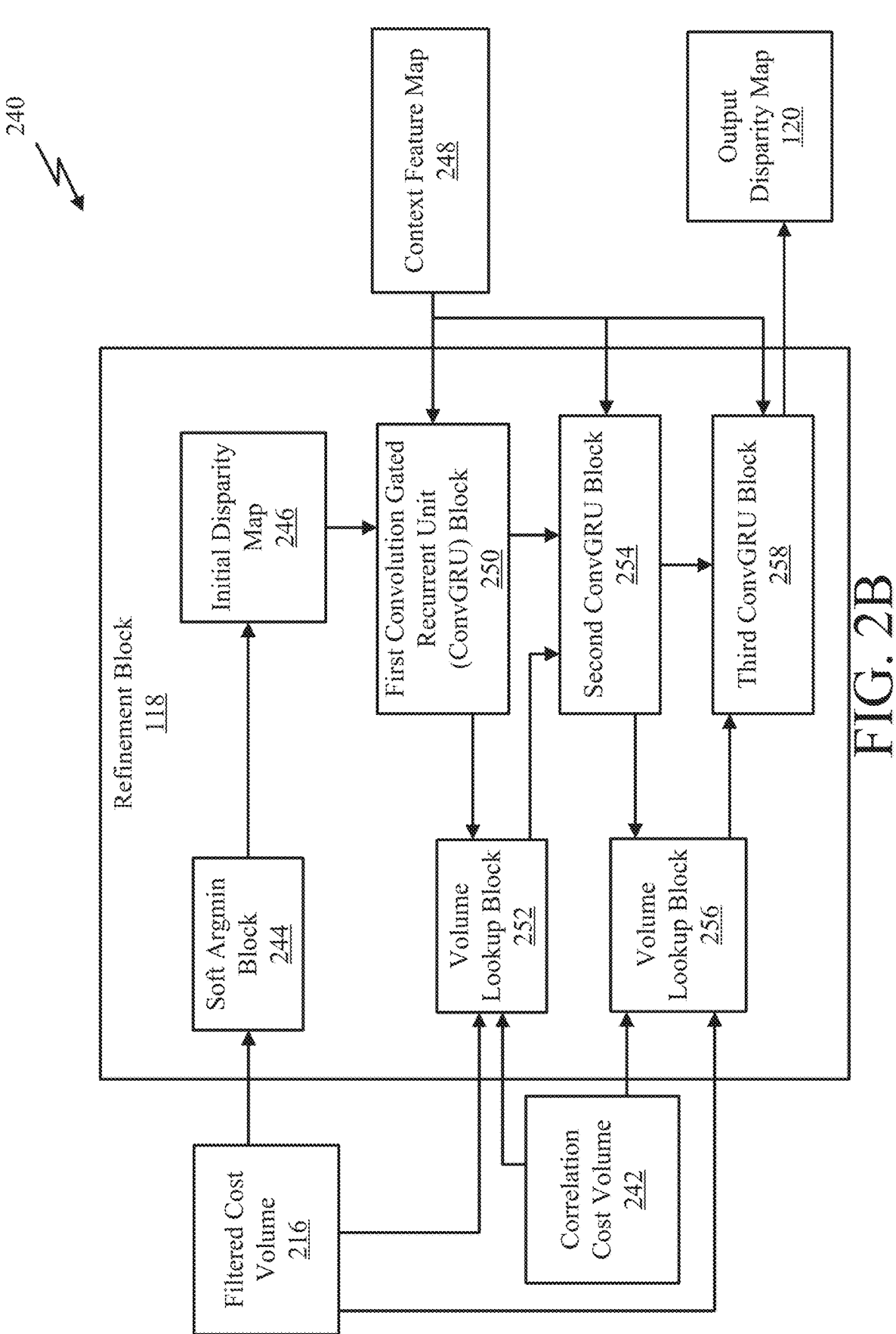
FIG. 2B shows an overview of using the refinement block to generate the output disparity map, in accordance with an embodiment.

FIG. 2B shows an overview 240 of using the refinement block 118 to generate the output disparity map 120, in accordance with an embodiment. For instance, the filtered cost volume 216, the correlation cost volume 242, and the context feature map 248 are provided as input to the refinement block 118. Initially, the soft argmin block 244 may perform a soft argmin function to generate the initial disparity map 246 from the filtered cost volume 216. For example, the expression to produce the initial disparity map 246 is shown below:

$$d_0 = \sum_{d=0}^{\frac{D}{4}-1} d \cdot Softmax(V_c')(d)$$

where $d_0$ is the initial disparity map 246 and is at a ¼ scale of the original image resolution of the right and left images 102, 104, Softmax is a Softmax operation, and $$V'_C$$

is the filtered cost volume 216.

Following, the refinement block 118 may perform iterative refinement of the initial disparity map 246. For instance, the first ConvGRU block 250 may obtain the initial disparity map 246 and the context feature map 248. The first ConvGRU block 250 may perform a convolution GRU operation and process the initial disparity map 246 and the context feature map 248 to generate a first refined disparity map. The first refined disparity map may be provided to the second ConvGRU block 254 and the volume lookup block 252.

The volume lookup block 252 may utilize the first refined disparity map from the first ConvGRU block 250, the filtered cost volume 216, and the correlation cost volume 242 to generate two feature vectors. For instance, the volume lookup block 252 may probe the filtered cost volume 216 and the correlation cost volume 242 based on the first refined disparity map to generate two feature vectors—a first feature vector associated with the filtered cost volume 216 and a second feature vector associated with the correlation cost volume 242. The volume lookup block 252 may provide the two feature vectors to the second ConvGRU block 254.

The second ConvGRU block 254 may process the two feature vectors, the first refined disparity map, and the context feature map 248 to generate a second refined disparity map. Then, similar to the first ConvGRU block 250, the second refined disparity map may be provided to the third ConvGRU block 258 and the volume lookup block 256. The volume lookup block 256 may operate similarly to the volume lookup block 252 and two feature vectors are provided to the third ConvGRU block 258.

The third ConvGRU block 258 may process the two feature vectors, the context feature map 248 and the second refined disparity map to generate the output disparity map 120. While only three ConvGRU blocks 250, 254, and 258 are shown in FIG. 2B, the refinement block 118 may include any number of ConvGRU blocks (e.g., thirty-two ConvGRU blocks). For example, the refinement block 118 may include any number of refinement iterations (e.g., thirty-two refinement iterations). For instance, each iteration may include using a ConvGRU block to generate a refined disparity map based on the initial disparity map 246 or a previous refined disparity map, the context feature map 248, and the two feature vectors from the volume lookup block (e.g., the volume lookup blocks 252 and 256) until the last iteration generates an output disparity map 120 that is provided as output from the Foundational Stereo Model.

In other words, given the initial disparity map $d_0$ 246, the refinement block 118 may perform iterative GRU updates to progressively refine the disparity, which helps to avoid local optimum and accelerate convergence. In general, the k-th update may be formulated as:

$$V_{corr}(w', h, w) = \left\langle f_l^{(4)}(h, w), f_r^{(4)}(h, w') \right\rangle$$

$$F_V(h, w) = [V'_C(d_k, h, w), V_{corr}(w - d_k, h, w)]$$

-continued $$x_k = [Conv_v(F_V), Conv_d(d_k), d_k, c]$$

$$z_k = \sigma(Conv_z([h_{k-1}, x_k]))$$

$$r_k = \sigma(Conv_r([h_{k-1}, x_k]))$$

$$\hat{h}_k = \tanh(Conv_h([r_k \odot h_{k-1}, x_k]))$$

$$h_k = (1 - z_k) \odot h_{k-1} + z_k \odot \hat{h}_k$$

$$d_{k+1} = d_k + Conv_\Delta(h_k)$$

where $\odot$ denotes element-wise product; $\sigma$ denotes sigmoid;

$$V_{corr} \in \mathbb{R}^{\frac{W}{4} \times \frac{H}{4} \times \frac{W}{4}}$$

is the pair-wise correlation volume; $F_V$ represents the looked up volume features using latest disparity; $c=\text{ReLU}(f_c)$ encodes the context feature from left image, including STA adapted features that are described above, which effectively guides the refinement process to leverage the rich monocular priors.

In some embodiments, three levels of GRU blocks may be used to perform coarse-to-fine hidden state update in each iteration, where the initial hidden states are produced from context features $$h_0^{(i)} = \tanh\left(f_c^{(i)}\right),$$

$i \in \{4,8,16\}$. At each level, an attention-based selection mechanism may be leveraged to capture information at different frequencies. Further, the current iteration's disparity map $d_k$ may be up-sampled to the full resolution using convex sampling.

During training, the Foundational Stereo Model may be trained utilizing one or more loss functions such as trained using following objective:

$$L = |d_0 - \bar{d}|_{smooth} + \sum_{k=1}^{K} \gamma^{K-k} \|d_k - \bar{d}\|_1$$

where $\bar{d}$ represents the ground-truth disparity, $|\cdot|$ smooth denotes the smooth $L_1$ loss, k is the iteration number, $\gamma$ is a parameter such as 0.9, and exponentially increasing weights may be applied to supervise the iteratively refined disparity.

For instance, the first term (e.g., the smooth L1 loss $(|d_0 - \bar{d}|_{smooth})$ may be configured to combine the strengths of two common loss functions: Mean Squared Error (MSE) and Mean Absolute Error (MAE). This may work as follows:

1. Behavior for small differences: When the difference between the predicted value and the actual value (residual) is small, the smooth L1 loss may behave similar to the MSE. For instance, the smooth L1 loss may square the residual, which makes it more sensitive to small errors and encourages finer adjustments.
2. Behavior for large differences: When the residual becomes large, the smooth L1 loss may behave similar to MAE. The smooth L1 loss may grow linearly with the residual, making it less sensitive to outliers as compared to MSE, which would grow quadratically.

The 2$^{nd}$ terms $$\left(\sum_{k=1}^{K} \gamma^{K-k} \|d_k - \bar{d}\|_1\right)$$

perform directly L1 loss (absolute) between prediction ($d_k$) and ground-truth ($\bar{d}$). Both the smooth loss term (e.g., the smooth L1 loss) and the direct loss term (e.g., the direct L1 lose between the prediction and the ground-truth) may be averaged over each pixel.

Based on the above objective, the Foundational Stereo Model may be trained. In some examples, during training, the monocular depth estimation models 154 of the first STA 106 and the second STA 108 may be frozen. However, the other aspects of the Foundational Stereo Model such as, but not limited to, the side-tuning CNNs 156 of the first STA 106 and the second STA 108, the third STA 110, the AHCF 116 (e.g., the APC filtering 202, the upsampling block 212, the downsampling block 204, and/or the DT 210), and/or the refinement block 118 (e.g., the first through third ConvGRU blocks 250, 254, and 258) may be trained based on the above objective. Additionally, and/or alternatively, the side-tuning CNN 156 of the STAs 106 and 108 may share weights during training.

Among other benefits and advantages, embodiments of the present disclosure provide a Foundational Stereo Model that includes STAs 106 and 108 to generate an initial hybrid cost volume 112. The STAs 106 and 108 utilize a monocular depth estimation model 154 and a side-tuning CNN 156. Furthermore, the initial hybrid cost volume 112 is generated based on a group correlation cost volume $V_{gwc}$ and a concatenation cost volume $V_{cat}$. Additionally, and/or alternatively, the Foundational Stereo Model further includes an AHCF 116 that generates a filtered hybrid cost volume 216 based on the initial hybrid cost volume 112. The AHCF 116 includes a first branch for the spatial dimensions (e.g., APC filtering 202) and a second branch for the disparity dimensions (e.g., the generation of the disparity tokens 206 and the DT 210). Additionally, and/or alternatively, the Foundational Stereo Model also includes a refinement block 118 that utilizes ConvGRU blocks 250, 254, and 258 to iteratively refine an initial disparity map 246 to generate an output disparity map 120.

Figure 3:
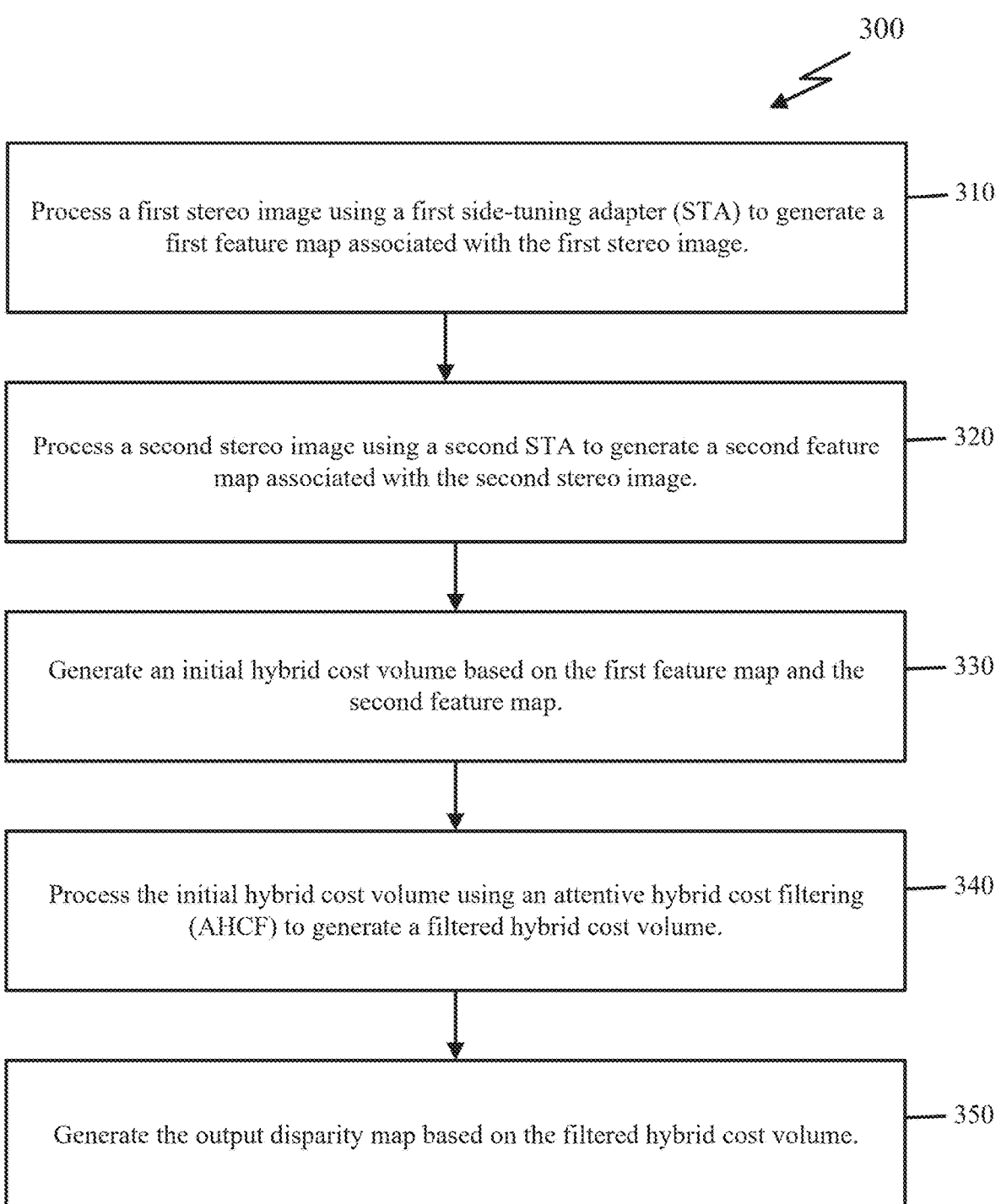
FIG. 3 provides a flow diagram illustrating a method for using a Foundational Stereo Model to generate an output disparity map, in accordance with an embodiment.

FIG. 3 provides a flow diagram illustrating a method 300 for using a Foundational Stereo Model to generate an output disparity map, in accordance with an embodiment. Each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the overviews 100, 150, 200, and/or 240. However, the method 300 may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 310, a first stereo image is processed using a first STA 106 to generate a first feature map associated with the first stereo image. In an embodiment, the first STA 106 comprises a first monocular depth estimation model and a first side-tuning convolutional neural network (CNN). The generating the first feature map comprises: processing the first stereo image using the first monocular depth estimation model to generate monocular depth features; processing the first stereo image using the first side-tuning CNN to generate CNN pyramid features; and concatenating the monocular depth features and the CNN pyramid features to generate the first feature map.

At step 320, a second stereo image is processed using a second STA 108 to generate a second feature map associated with the second stereo image. In an embodiment, the second STA 108 comprises a second monocular depth estimation model and a second side-tuning CNN. The generating the second feature map comprises: processing the second stereo image using the second monocular depth estimation model to generate second monocular depth features; processing the second stereo image using the second side-tuning CNN to generate second CNN pyramid features; and concatenating the second monocular depth features and the second CNN pyramid features to generate the second feature map.

At step 330, an initial hybrid cost volume 112 is generated based on the first feature map and the second feature map. In an embodiment, generating the initial hybrid cost volume comprises: generating a group correlation cost volume based on the first feature map and the second feature map; generating a concatenation cost volume based on the first feature map and the second feature map; and concatenating the group correlation cost volume and the concatenation cost volume to obtain the initial hybrid cost volume. In an embodiment, generating the group correlation cost volume comprises: performing a dot product of the first feature map and the second feature map to obtain the group correlation cost volume. In an embodiment, generating the concatenation cost volume comprises: concatenating the first feature map and the second feature map to obtain the concatenation cost volume.

At step 340, the initial hybrid cost volume 112 is processed using an attentive hybrid cost filtering (AHCF) 116 to generate a hybrid cost volume. In an embodiment, the AHCF 116 comprises an axial-planar convolution (APC) filtering block 202 and a disparity transformer (DT) 210. The processing the initial hybrid cost volume using the AHCF 116 to generate the filtered hybrid cost volume comprises: filtering the initial hybrid cost volume using the APC filtering block 202 to generate an APC output; processing disparity tokens associated with the initial hybrid cost volume using the DT 210 to obtain a DT output; and generating the filtered hybrid cost volume based on the APC output and the DT output.

In an embodiment, the APC filtering block 202 comprises an hourglass neural network, and wherein filtering the initial hybrid cost volume using the APC filtering block 202 to generate the APC output comprises performing convolution operations using the hourglass neural network to obtain the APC output from the initial hybrid cost volume. In an embodiment, processing the disparity tokens to obtain the DT output comprises: downsampling the initial hybrid cost volume to obtain a downsampled initial hybrid cost volume; generating the disparity tokens based on reshaping the downsampled initial hybrid cost volume; and processing the disparity tokens using the DT to generate the DT output. Further, generating the filtered hybrid cost volume based on the APC output and the DT output comprises: upsampling the DT output to obtain an upsampled DT output; and generating the filtered hybrid cost volume based on the APC output and the upsampled DT output. In an embodiment, processing the disparity tokens using the DT to generate the DT output further comprises: encoding positional information into the disparity tokens to obtain encoded disparity tokens; and processing the encoded disparity tokens to generate the DT output. In an embodiment, generating the filtered hybrid cost volume based on the APC output and the DT output comprises: performing an element-wise add to the APC output and the DT output to obtain the filtered hybrid cost volume.

At step 350, the output disparity map 120 is generated based on the filtered hybrid cost volume. In an embodiment, generating the output disparity map based on the filtered hybrid cost volume comprises: generating an initial disparity map based on the filtered hybrid cost volume; performing one or more convolution gated recurrent unit (ConvGRU) operations to generate one or more intermediate disparity maps based on the initial disparity map; and generating the output disparity map based on the one or more intermediate disparity maps.

In an embodiment, generating the one or more first intermediate disparity maps comprises: performing a first ConvGRU operation, from the one or more ConvGRU operations to generate a first intermediate disparity map from the one or more intermediate disparity maps; generating a first feature vector based on the filtered hybrid cost volume and the first intermediate disparity map; generating a second feature vector based on the first intermediate disparity map and a correlation cost volume, wherein the correlation cost volume is generated based on performing a dot-product of the first feature map and the second feature map; and performing a second ConvGRU operation, from the one or more ConvGRU operations, to generate a second intermediate disparity map, from the one or more intermediate disparity maps, based on the first intermediate disparity map, the first feature vector, and the second feature vector, and wherein generating the output disparity map is based on the second intermediate disparity map.

In an embodiment, the method 300 further includes processing the second stereo image using a convolutional neural network to generate context features; and concatenating the context features and monocular depth features from a monocular depth estimation model to obtain a context feature map, and wherein performing the one or more ConvGRU operations to generate the one or more intermediate disparity maps is further based on the context feature map.

In an embodiment, at least one of steps 310-350 and/or the further steps described above for method 300 are performed on a server or in a data center to generate the output disparity map, and the output disparity map is streamed to a user device. In an embodiment, at least one of steps 310-350 and/or the further steps described above for method 300 is performed within a cloud computing environment. In an embodiment, at least one of steps 310-350 and/or the further steps described above for method 300 is performed for training, testing, or certifying a neural network employed in a machine, robot, or autonomous vehicle. In an embodiment, at least one of steps 310-350 and/or the further steps described above for method 300 is performed on a virtual machine comprising a portion of a graphics processing unit.

In some examples, embodiments of the present disclosure describe a Foundational Stereo Model, which is a large foundation model for stereo depth estimation that achieves strong zero-shot generalization without per-domain fine-tuning. Embodiments of the present disclosure include a side-tuning feature backbone (e.g., the STAs 106, 108, and 110) that adapts internet-scale rich priors from a model (e.g., monocular depth estimation model 154) that is trained on real monocular images to the stereo setup. To effectively leverage these rich monocular priors embedded into the 4D cost volume, embodiments of the present disclosure further include an AHCF 116, consisting of 3D APC filtering 202 and a DT 210. The AHCF 116 may decouple the standard 3D convolution into two separate spatial-oriented and disparity-oriented 3D convolutions, enhancing the receptive fields for volume feature aggregation. The DT 210 may perform self-attention over the entire disparity space within the cost volume, providing long range context for global reasoning. Together, these may significantly enhance the representation, leading to better disparity initialization, as well as more powerful features for the subsequent iterative refinement process (e.g., the refinement block 118).

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4:
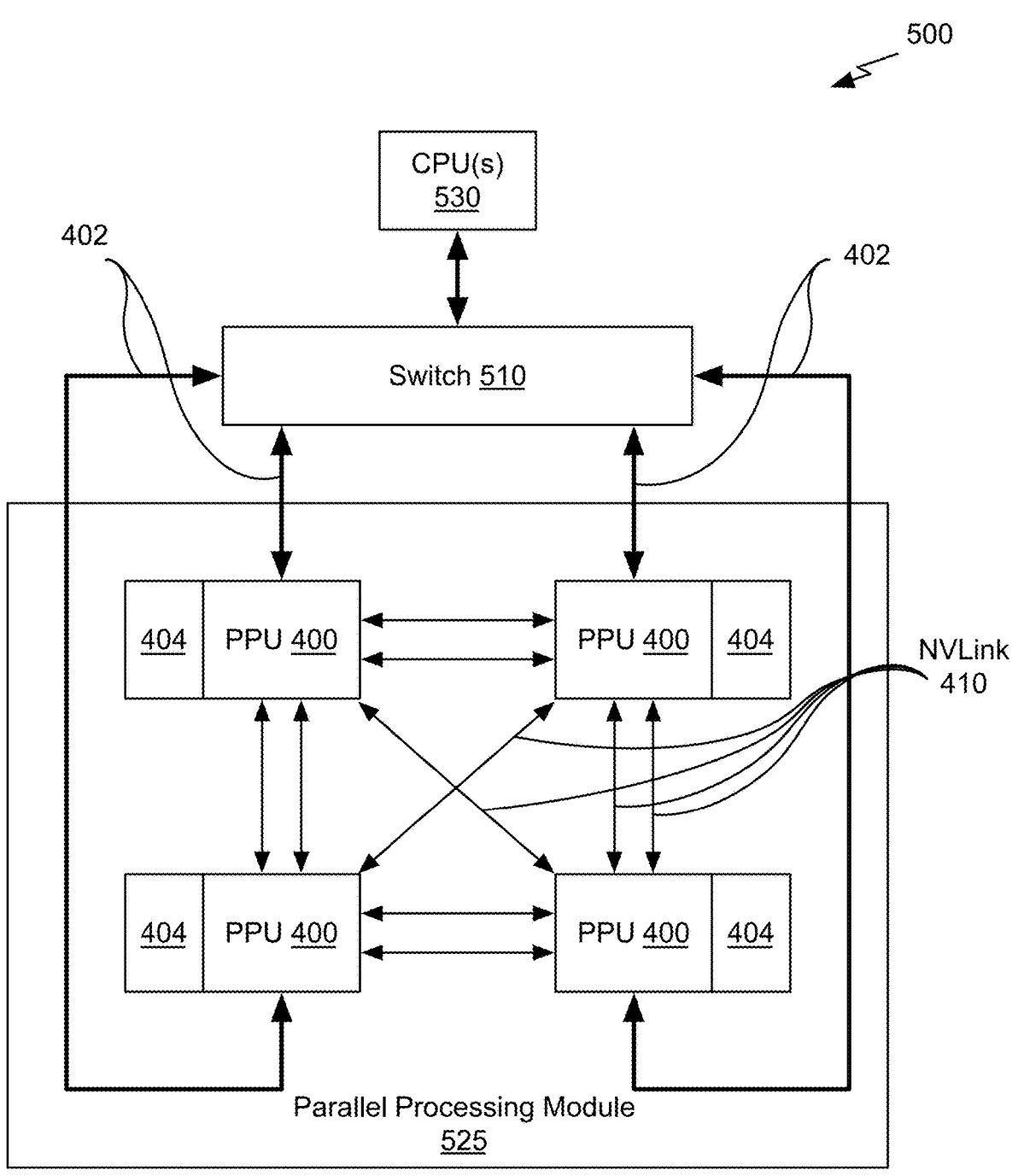
FIG. 4 is a conceptual diagram of a processing system implemented using a PPU, suitable for use in implementing some embodiments of the present disclosure.

FIG. 4 is a conceptual diagram of a processing system 500 implemented using multiple PPUs 400, in accordance with an embodiment. The exemplary system 500 may utilized as a particular node—or portion thereof—in the above-described multi-node computing systems. In addition to the multiple PPUs 400, the processing system 500 includes a CPU 530, switch 510, and respective memories 404 for the PPUs 400.

Each parallel processing unit (PPU) 400 may include hundreds or thousands of cores that are capable of handling hundreds or thousands of software threads simultaneously. The PPUs 400 may generate pixel data for output images in response to rendering commands (e.g., rendering commands from the CPU(s) 530 received via a host interface). The PPUs 400 may include graphics memory, such as display memory, for storing pixel data or any other suitable data, such as GPU data. The display memory may be included as part of the memory 404. The PPUs 400 may include two or more GPUs operating in parallel (e.g., via a link). The link may directly connect the GPUs (e.g., using NVLINK 410) or may connect the GPUs through a switch (e.g., using switch 510). When combined together, each PPU 400 may generate pixel data or GPGPU data for different portions of an output or for different outputs (e.g., a first PPU for a first image and a second PPU for a second image). Each PPU 400 may include its own memory 404, or may share memory with other PPUs 400.

The PPUs 400 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The NVLink 410 provides high-speed communication links between each of the PPUs 400. Although a particular number of NVLink 410 and interconnect 402 connections are illustrated in FIG. 4, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 4, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 4, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

Figure 5A:
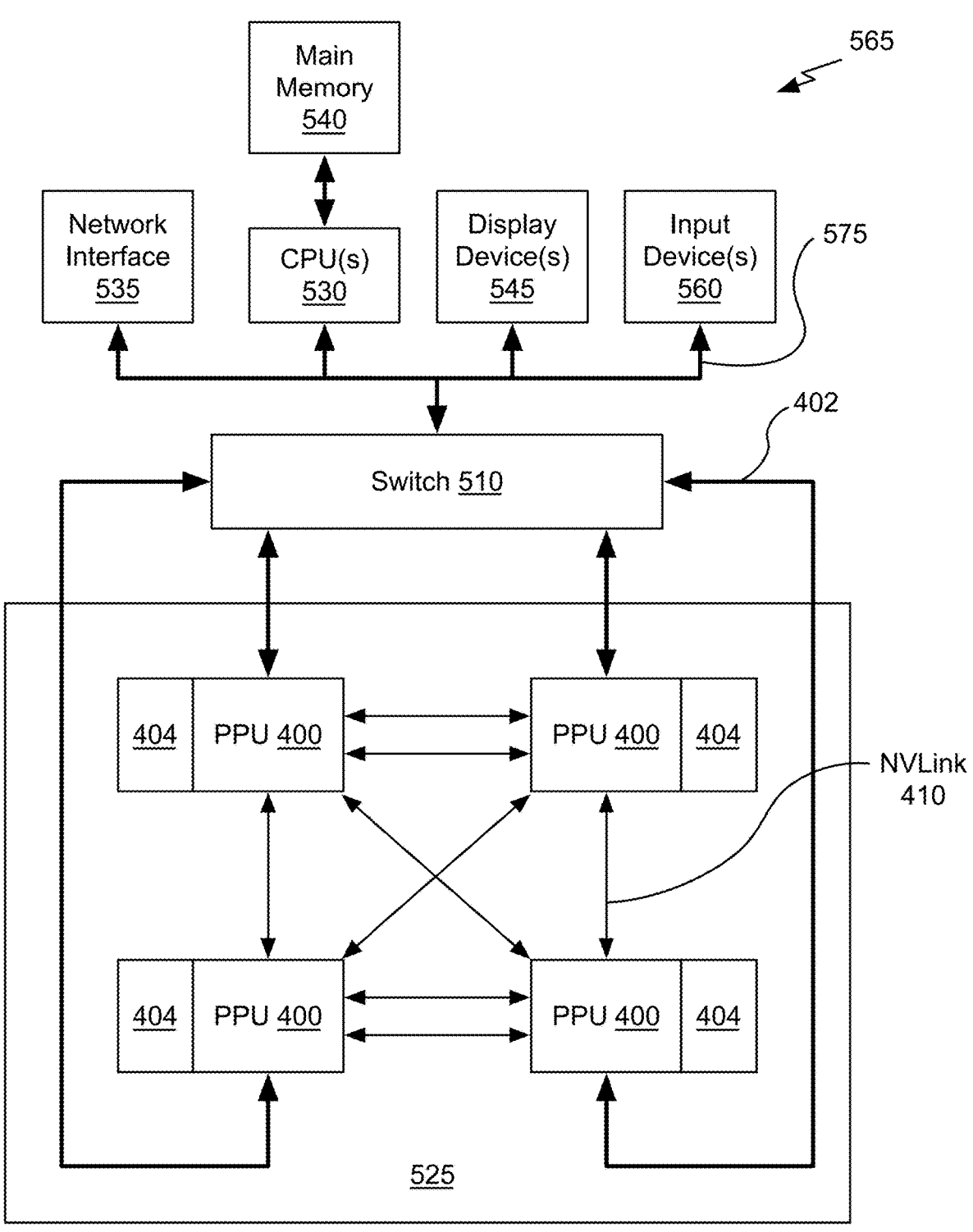
FIG. 5A illustrates an exemplary system in which the various architecture and/or functionality of the various previous embodiments may be implemented.

FIG. 5A illustrates an exemplary system 565 in which the various architecture and/or functionality of the various previous embodiments may be implemented. The exemplary system 565 may be configured to implement the method 300 shown in FIG. 3.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5A are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5A is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5A.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 4 and/or exemplary system 565 of FIG. 5A—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 4 and/or exemplary system 565 of FIG. 5A. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes (e.g., neurons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5B:
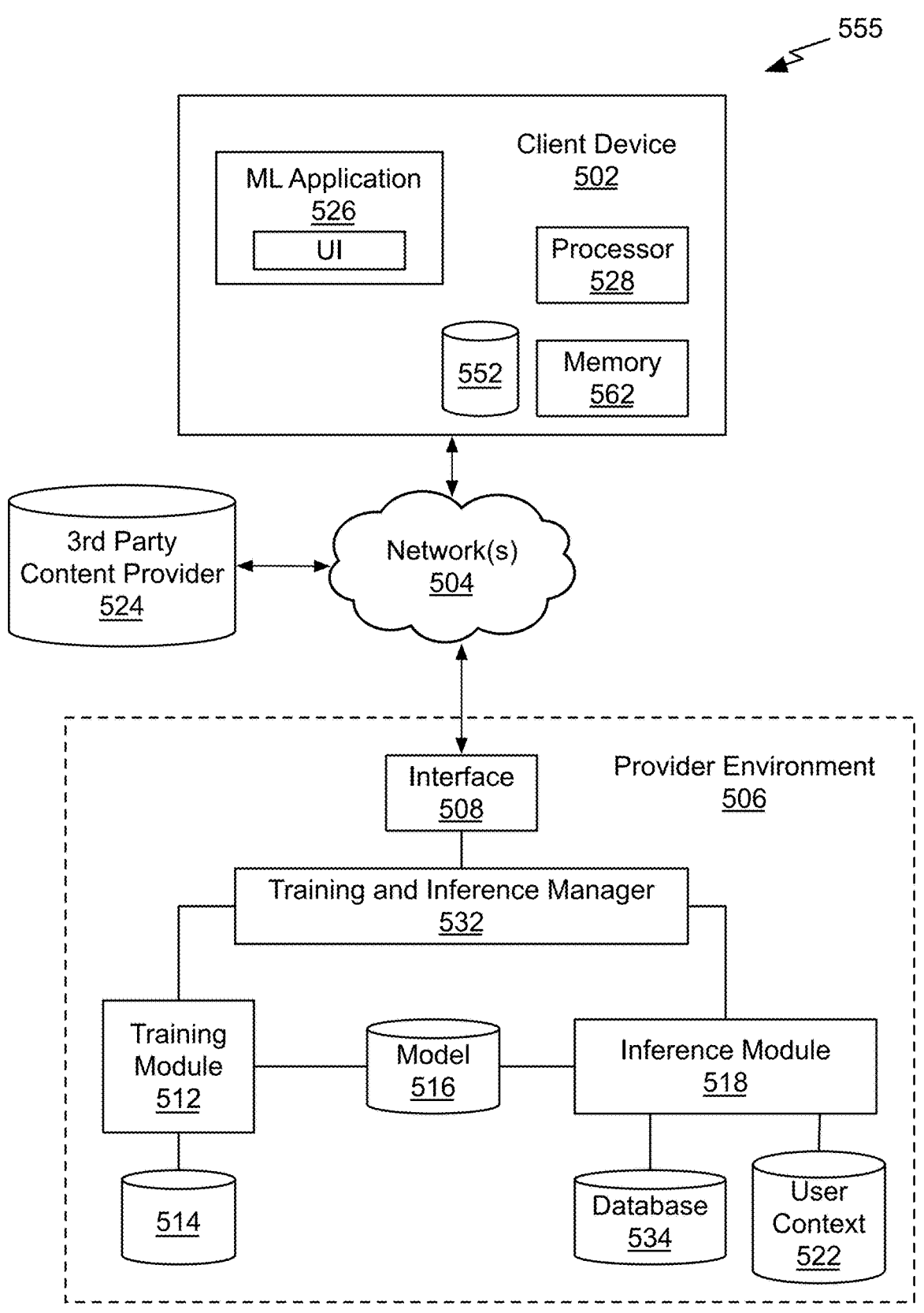
FIG. 5B illustrates components of an exemplary system that can be used to train and utilize machine learning, in at least one embodiment.

FIG. 5B illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506. In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
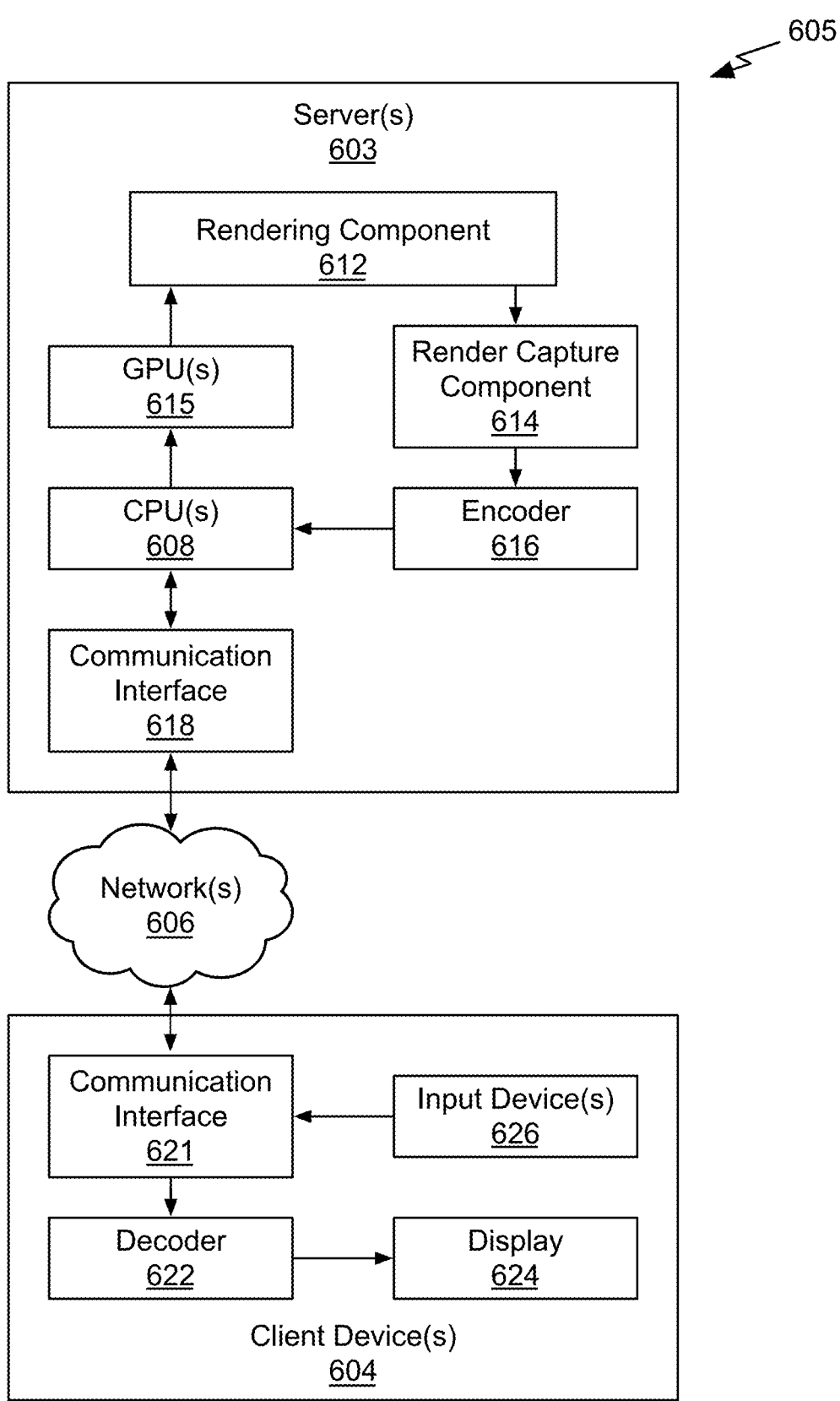
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 4 and/or exemplary system 565 of FIG. 5A), client device(s) 604 (which may include similar components, features, and/or functionality to the example processing system 500 of FIG. 4 and/or exemplary system 565 of FIG. 5A), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s)

603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

The arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. Various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for using a Foundational Stereo Model to generate an output disparity map, comprising:
processing a first stereo image using a first side-tuning adapter (STA) to generate a first feature map associated with the first stereo image;
processing a second stereo image using a second STA to generate a second feature map associated with the second stereo image, wherein the second STA is different from the first STA;
generating an initial hybrid cost volume based on the first feature map and the second feature map;
processing the initial hybrid cost volume using attentive hybrid cost filtering (AHCF) to generate a filtered hybrid cost volume; and
generating the output disparity map based on the filtered hybrid cost volume.

2. The computer-implemented method of claim 1, wherein the first STA comprises a first monocular depth estimation model and a first side-tuning convolutional neural network (CNN), wherein generating the first feature map comprises:
processing the first stereo image using the first monocular depth estimation model to generate monocular depth features;
processing the first stereo image using the first side-tuning CNN to generate CNN pyramid features; and
concatenating the monocular depth features and the CNN pyramid features to generate the first feature map.

3. The computer-implemented method of claim 2, wherein the second STA comprises a second monocular depth estimation model and a second side-tuning CNN, wherein generating the second feature map comprises:
processing the second stereo image using the second monocular depth estimation model to generate second monocular depth features;
processing the second stereo image using the second side-tuning CNN to generate second CNN pyramid features; and
concatenating the second monocular depth features and the second CNN pyramid features to generate the second feature map.

4. The computer-implemented method of claim 1, wherein generating the initial hybrid cost volume comprises:
generating a group correlation cost volume based on the first feature map and the second feature map;
generating a concatenation cost volume based on the first feature map and the second feature map; and
concatenating the group correlation cost volume and the concatenation cost volume to obtain the initial hybrid cost volume.

5. The computer-implemented method of claim 4, wherein generating the group correlation cost volume comprises:
performing a dot product of the first feature map and the second feature map to obtain the group correlation cost volume.

6. The computer-implemented method of claim 5, wherein generating the concatenation cost volume comprises:
concatenating the first feature map and the second feature map to obtain the concatenation cost volume.

7. The computer-implemented method of claim 1, wherein the AHCF comprises an axial-planar convolution (APC) filtering block and a disparity transformer (DT), and wherein processing the initial hybrid cost volume using the AHCF to generate the filtered hybrid cost volume comprises:
filtering the initial hybrid cost volume using the APC filtering block to generate an APC output;
processing disparity tokens associated with the initial hybrid cost volume using the DT to obtain a DT output; and
generating the filtered hybrid cost volume based on the APC output and the DT output.

8. The computer-implemented method of claim 7, wherein the APC filtering block comprises an hourglass neural network, and wherein filtering the initial hybrid cost volume using the APC filtering block to generate the APC output comprises performing convolution operations using the hourglass neural network to obtain the APC output from the initial hybrid cost volume.

9. The computer-implemented method of claim 7, wherein processing the disparity tokens to obtain the DT output comprises:

downsampling the initial hybrid cost volume to obtain a downsampled initial hybrid cost volume;

generating the disparity tokens based on reshaping the downsampled initial hybrid cost volume; and processing the disparity tokens using the DT to generate the DT output, and wherein generating the filtered hybrid cost volume based on the APC output and the DT output comprises:

upsampling the DT output to obtain an upsampled DT output; and generating the filtered hybrid cost volume based on the APC output and the upsampled DT output.

10. The computer-implemented method of claim 9, wherein processing the disparity tokens using the DT to generate the DT output further comprises:

encoding positional information into the disparity tokens to obtain encoded disparity tokens; and processing the encoded disparity tokens to generate the DT output.

11. The computer-implemented method of claim 7, wherein generating the filtered hybrid cost volume based on the APC output and the DT output comprises:

performing an element-wise add to the APC output and the DT output to obtain the filtered hybrid cost volume.

12. The computer-implemented method of claim 1, wherein generating the output disparity map based on the filtered hybrid cost volume comprises:

generating an initial disparity map based on the filtered hybrid cost volume;

performing one or more convolution gated recurrent unit (ConvGRU) operations to generate one or more intermediate disparity maps based on the initial disparity map; and generating the output disparity map based on the one or more intermediate disparity maps.

13. The computer-implemented method of claim 12, wherein generating the one or more intermediate disparity maps comprises:

performing a first ConvGRU operation, from the one or more ConvGRU operations, to generate a first intermediate disparity map from the one or more intermediate disparity maps;

generating a first feature vector based on the filtered hybrid cost volume and the first intermediate disparity map;

generating a second feature vector based on the first intermediate disparity map and a correlation cost volume, wherein the correlation cost volume is generated based on performing a dot-product of the first feature map and the second feature map; and performing a second ConvGRU operation, from the one or more ConvGRU operations, to generate a second intermediate disparity map, from the one or more intermediate disparity maps, based on the first intermediate disparity map, the first feature vector, and the second feature vector, and wherein generating the output disparity map is based on the second intermediate disparity map.

14. The computer-implemented method of claim 12, further comprising:

processing the second stereo image using a convolutional neural network to generate context features; and concatenating the context features and monocular depth features from a monocular depth estimation model to obtain a context feature map, and wherein performing the one or more ConvGRU operations to generate the one or more intermediate disparity maps is further based on the context feature map.

15. The computer-implemented method of claim 1, wherein at least one of the steps of processing and generating are performed on a server or in a data center to generate the output disparity map, and the output disparity map is streamed to a user device.

16. The computer-implemented method of claim 1, wherein at least one of the steps of processing and generating are performed within a cloud computing environment.

17. The computer-implemented method of claim 1, wherein at least one of the steps of processing and generating are performed for training, testing, or certifying a neural network employed in a machine, robot, or autonomous vehicle.

18. The computer-implemented method of claim 1, wherein at least one of the steps of processing and generating are performed on a virtual machine comprising a portion of a graphics processing unit.

19. A computer-implemented method for using a Foundational Stereo Model to generate an output disparity map, comprising:

processing a first stereo image using a first side-tuning adapter (STA) to generate a first feature map associated with the first stereo image, wherein the first STA comprises a first monocular depth estimation model and a first side-tuning convolutional neural network (CNN);

processing a second stereo image using a second STA to generate a second feature map associated with the second stereo image, wherein the second STA comprises a second monocular depth estimation model and a second side-tuning CNN, wherein the second STA is different from the first STA;

generating an initial hybrid cost volume based on the first feature map and the second feature map; and generating the output disparity map based on the initial hybrid cost volume.

20. The computer-implemented method of claim 19, wherein generating the first feature map comprises:

processing the first stereo image using the first monocular depth estimation model to generate monocular depth features;

processing the first stereo image using the first side-tuning CNN to generate CNN pyramid features; and concatenating the monocular depth features and the CNN pyramid features to generate the first feature map.

21. The computer-implemented method of claim 20, wherein generating the second feature map comprises:

processing the second stereo image using the second monocular depth estimation model to generate second monocular depth features;

processing the second stereo image using the second side-tuning CNN to generate second CNN pyramid features; and concatenating the second monocular depth features and the second CNN pyramid features to generate the second feature map.

22. The computer-implemented method of claim 19, wherein generating the initial hybrid cost volume comprises:

generating a group correlation cost volume based on the first feature map and the second feature map;

generating a concatenation cost volume based on the first feature map and the second feature map; and concatenating the group correlation cost volume and the concatenation cost volume to obtain the initial hybrid cost volume.

23. The computer-implemented method of claim 22, wherein generating the group correlation cost volume comprises performing a dot product of the first feature map and the second feature map to obtain the group correlation cost volume and wherein generating the concatenation cost volume comprises concatenating the first feature map and the second feature map to obtain the concatenation cost volume.

24. A computer-implemented method for using a Foundational Stereo Model to generate an output disparity map, comprising:

generating an initial hybrid cost volume based on a first feature map associated with a first stereo image and a second feature map associated with a second stereo image;

filtering the initial hybrid cost volume by an axial-planar convolution (APC) filtering block to generate an APC output, wherein an attentive hybrid cost filtering (AHCF) comprises the APC filtering block and a disparity transformer (DT);

processing disparity tokens associated with the initial hybrid cost volume using the DT to obtain a DT output;

generating the filtered hybrid cost volume based on the APC output and the DT output; and generating the output disparity map based on the filtered hybrid cost volume.

25. The computer-implemented method of claim 24, wherein the APC filtering block comprises an hourglass neural network, and wherein filtering the initial hybrid cost volume using the APC filtering block to generate the APC output comprises performing convolution operations using the hourglass neural network to obtain the APC output from the initial hybrid cost volume.

26. The computer-implemented method of claim 24, wherein processing the disparity tokens to obtain the DT output comprises:

downsampling the initial hybrid cost volume to obtain a downsampled initial hybrid cost volume;

generating the disparity tokens based on reshaping the downsampled initial hybrid cost volume; and processing the disparity tokens using the DT to generate the DT output.

27. The computer-implemented method of claim 26, wherein generating the filtered hybrid cost volume based on the APC output and the DT output comprises:

upsampling the DT output to obtain an upsampled DT output; and generating the filtered hybrid cost volume based on the APC output and the upsampled DT output.

28. The computer-implemented method of claim 26, wherein processing the disparity tokens using the DT to generate the DT output further comprises:

encoding positional information into the disparity tokens to obtain encoded disparity tokens; and processing the encoded disparity tokens to generate the DT output.

29. The computer-implemented method of claim 24, wherein generating the filtered hybrid cost volume based on the APC output and the DT output comprises:

performing an element-wise add to the APC output and the DT output to obtain the filtered hybrid cost volume.

* * * * *